(12) United States Patent
Yang et al.

(10) Patent No.: US 6,301,586 B1
(45) Date of Patent: Oct. 9, 2001

(54) SYSTEM FOR MANAGING MULTIMEDIA OBJECTS

(75) Inventors: Xinping Yang, Mountain View, CA (US); Andrew H. Tomat, Arlington, VA (US); Timothy L. Kohler, San Jose; Laurence Lavendel, Aptos, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/944,432

(22) Filed: Oct. 6, 1997

(51) Int. Cl.[7] ....................................................... G06F 7/12

(52) U.S. Cl. .................................. 707/104; 707/5; 705/27

(58) Field of Search .................................. 707/104, 5, 8; 705/27, 24, 25, 26; 395/200; 345/331, 302, 328; 358/537, 401

(56) References Cited

U.S. PATENT DOCUMENTS

| | | | |
|---|---|---|---|
| 5,446,842 | * | 8/1995 | Schaeffer et al. ..................... 395/200 |
| 5,752,244 | * | 5/1998 | Rose et al. ................................ 707/5 |
| 5,794,216 | * | 8/1998 | Brown .................................... 705/27 |
| 5,819,288 | * | 10/1998 | De Bonet ............................. 707/104 |

OTHER PUBLICATIONS

"Microsoft Office White Paper Microsoft Access for Windows 95", Microsoft Corporation 1995, pp. 1–13.

"Microsoft Office Product Enhancement Guide Microsoft Access for Windows 95", Microsoft Corporation, Jun. 1995, pp. 1–12.

"Microsoft Internet Information Server", Microsoft Corporation, 1995, pp. 1–12.

"Tutorial Overview", <http://www.microsoft.com/activeplatform/aspcomponents/default.asp>, (visited Sep. 11, 1997).

"Microsoft Access Home Page", <http://www.microsoft.com/access/>, Microsoft Corporation 1997, (1 page).

"Access 97 for Windows 95—Product Overview", <http://www.microsoft.com/products/prodref/3_ov.htm>, Microsoft Corporation 1997, (2 pp.).

"Microsoft Access 97", <http://www.microsoft.com/office/office97/documents/acc97ds/default.htm>, Microsoft Corporation 1997, (2 pp).

"Microsoft Access 97—Get Organized", <http://www.microsoft.com/office/office97/documents/acc97ds/organized.htm>, Microsoft Corporation 1997, (2 pp.).

"Microsoft Access 97—Connected", <http://www.microsoft.com/office/office97/documentsacc97ds/connected.htm>, Microsoft Corporation 1997, (2 pp.).

"Microsoft Access 97—Results", <http://www.microsoft.com/office/office97/documents/acc97ds/results.htm>, Microsoft Corporaton 1997, (2 pp.).

(List continued on next page.)

Primary Examiner—Wayne Amsbury
Assistant Examiner—Thu-Thao Havan
(74) Attorney, Agent, or Firm—Fitzpatrick, Cella, Harper & Scinto

(57) ABSTRACT

A system for managing multimedia objects such as text, images, sound, and video clips. The system provides improved organization of multimedia objects, through use of albums organized into collections of albums. In addition, improved printout of multimedia objects through user-activateable selection of particular fields from a multimedia database to accompany printouts of multimedia objects. A user interface is defined for allowing a user to obtain a thumbnail view of images in multimedia objects, simply by sliding a mouse cursor over database entry pointing of the image. In addition, a unique architecture of a system for managing multimedia objects is described.

66 Claims, 22 Drawing Sheets

OTHER PUBLICATIONS

"Microsoft Access 97—Quick Info", <http://www.microsoft.com/office/office97/documents/acc97ds/quickinfo.htm>, Microsoft Corporation 1997, (2 pp.).

"Microsoft Access 97—Specifications", <http://www.microsoft.com/office/office97/documents/acc97ds/specs.htm>, Microsoft Corporation 1997, (2 pp.).

"ASP Components Catalog", <http://www.microsoft.com/activeplatform/aspcomponents/default.asp>, Microsoft Corporation 1997 (3 pp.).

"What is Active Server Pages?" <http://www.microsoft.com/iis/LearnAboutIIS/ActiveServer/about.htm>, Microsoft Corporation 1997, (3 pp.).

"Active Server", <http://www.microsoft.com/iis/LearnAboutIIS/ActiveServer/default.asp, Microsoft Corporation 1997, (1 page).

"What is Active Server Pages?" <http://www.microsoft.com/iis/LearnAboutIIS/ActiveServer/faq.htm>, Microsoft Corporation 1997, (3 pp.).

* cited by examiner

SYSTEM FOR MANAGING MULTIMEDIA OBJECTS

BACKGROUND OF THE INVENTION

1. Field of the Invention

The present invention relates to a system for managing multimedia objects such as text, images, sound, and video clips. More particularly, the present invention relates to management of a database which includes such multimedia objects, together with software tools that facilitate input, manipulation and output of multimedia objects.

2. Description of the Related Art

Multimedia objects are computerized objects that contain components from different media. A typical multimedia object will include a text component, a picture component (such as a computerized image file in .JPEG or .GIF format), a sound clip (such as a computerized file in a .WAV format), and an executable component (such as ActiveX controls). Multimedia objects are interesting because they provide the means to convey large quantities of information quickly.

One problem commonly encountered when using multimedia objects is the difficulty in managing them. Stated another way, when the tremendous amount of information in a single multimedia object is multiplied by the number of multimedia objects, the resulting amount of information is staggering.

To deal with this staggering amount of information, the traditional concept of a database has been expanded so as to allow storage of, and access to, each individual component of a multimedia object. Thus, conventionally available databases such as Access from Microsoft Corporation allow not only text data to be included, but also allow image data, sound data, and executable data also to be included in a database record. Thus, conventional database technology, extended to include the concepts of images, sound files, executables and other multimedia components, has considerably improved the ability to manage multimedia objects.

At the same time, improvement is needed, particularly in the areas of input, manipulation and output of multimedia objects.

SUMMARY OF THE INVENTION

It is an object of the invention to provide improved management of multimedia objects by means of enhanced input, manipulation, and output thereof.

Thus, in one aspect, the invention organizes multimedia objects into plural collections, with each collection having one or more multimedia albums. Each album can contain plural multimedia objects, with each object including multimedia components such as text components, image components, sound components, and video components. Information at each multimedia component is stored in a separate record, and each and every multimedia object within a collection has exactly the same fields. Improved management of multimedia objects is afforded by providing the ability for a user to define new albums within a pre-existing collection, or by defining new collections. When a new album is added to an existing collection, the field for records in the album is the same as the pre-existing field format for other albums in the collection. On the other hand, when a new collection is added, new fields can be defined and stored as a new table entry in the overall multimedia database.

By virtue of the foregoing, it is possible to tailor the format of each collection so that the format is most suitable to the types of multimedia objects stored in the collection's albums. For example, if one collection were defined for storing albums for storing a store's inventory of jewelry, suitable fields in a database record might include a picture of jewelry, weight and clarity of gemstones, price, and a sound clip describing salient features of each item. Such fields, while appropriate to a jewelry inventory, are entirely inappropriate for another album which might be defined for storing inventory of computers. For such an album, suitable fields might include processor power, memory, add-in devices, and the like. With the invention, it is possible to define albums having database record fields that are tailored specifically to the multimedia objects contained therein.

According to another aspect, printout of multimedia objects is enhanced by allowing user-selection of some of the plural fields in the database to be printed in accompaniment with image data in the database. According to this aspect, a user interface is defined which allows a user to select fields from the database to be printed with an image component of the multimedia object, together with user selection of a template with which data is to be printed. A destination for printout can also be selected so as to afford a choice between printout as a manuscript, or exporting printed data to an HTML file for publication on the World Wide Web.

In another aspect, the invention provides for automatic pop up of thumbnail view of image files, in situations where database records for an album are displayed in a flat tabular form a user has positioned his mouse cursor over an entry corresponding to an image. Specifically, when using databases, it is common for a user to display all entries in the database in a flat tabular format, with each subsequent record in the database extending in the downward direction, and with each individual field within a database record extending in the horizontal direction. Such a format is well-suited to display an understanding of text components of a multimedia object. However, for image components, such a view provides very little information to the user. According to the invention, when a user positions his mouse cursor over a database record field corresponding to an image, the invention automatically pops up a thumbnail view of the image.

A still further aspect of the invention involves the overall architecture of the system for managing multimedia objects. This architecture includes several different components, each of which contributes to the overall ability to input, manipulate and output multimedia objects. Thus, the architecture includes a database access object (DAO) which understands a structured query language (SQL) so as to create database tables and fields, add and otherwise manipulate tables into the database, and add and otherwise manipulate fields within each table. Connected to the database access object is an image manager, an album manager and a view manager. The image manager allows for adding, deleting, inserting, moving, cropping, re-sizing and otherwise manipulating images. The image manager includes hooks to TWAIN scanning protocol, image format translation, and image processing and manipulation routines.

The album manager allows for creating, opening, closing, saving and otherwise manipulating albums within the context of album collections. The album manager contains hooks to functional modules that allow for special effects such as a slide show effect, HTML generation for publishing pages on the World Wide Web, album printing, album sharing with third parties such as over the internet, and internet phone for real time audio discussion.

The view manager is responsible for view selection, database selection, table selection and field selection.

By virtue of the foregoing structure, in which a centralized database access object has connected to it an image manager, an album manager and a view manager, a system for managing multimedia objects can be implemented more readily, more efficiently, and with greater capabilities.

This brief summary has been provided so that the nature of the invention may be understood quickly. A more complete understanding of the invention can be obtained by reference to the following detailed description of a preferred embodiment thereof in connection with the attached drawings.

DETAILED DESCRIPTION OF THE PREFERRED EMBODIMENT

Figure 1:
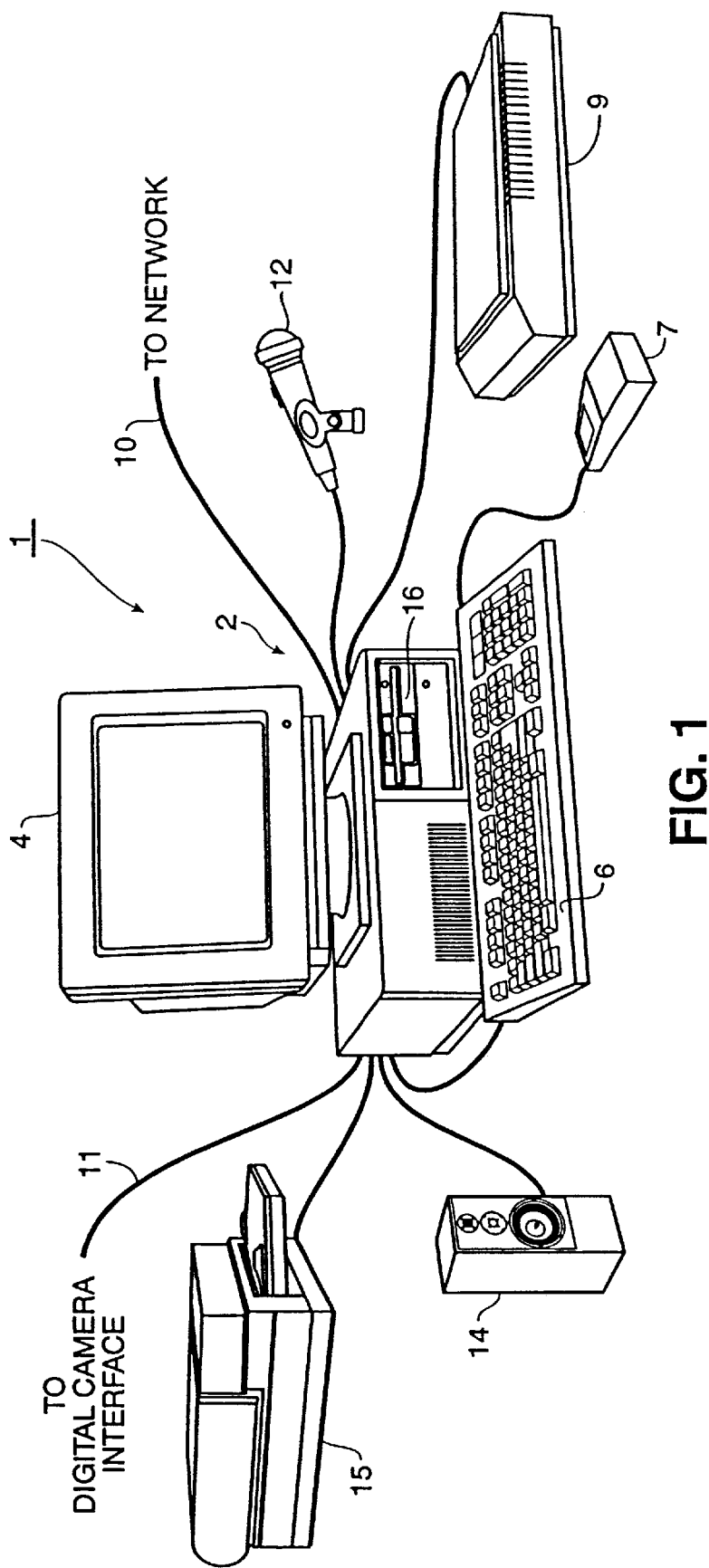
FIG. 1 is a view showing the outward appearance of computing equipment used in the practice of a representative embodiment of the invention.

FIG. 1 is a view showing the outward appearance of computing equipment used in the practice of a representative embodiment of the invention. As shown in FIG. 1, computing equipment 1 includes personal computer (hereinafter "PC") 2, such as an IBM PC or PC-compatible computer having a windowing operating system such as Microsoft Windows 95. Computing equipment 1 further includes display screen 4 comprising a color monitor or the like, keyboard 6 for inputting text and user commands, pointing device 7 such as a mouse for pointing and manipulating objects displayed on display screen 4, and scanner 9 for acquiring image data by digitally scanning in documents. A network interface 10 and a digital camera interface 11 are provided so as to allow further access to other sources of digital image data, such as digital image data comprising still image or video clip data from an unshown digital camera, or from pre-stored image files from a network or the world wide web over network interface 10. Computing equipment 1 accesses audio files such as .WAV files either by creation of .WAV files from microphone 12 or from pre-existing .WAV files stored locally with computing equipment 1 or over network interface 10. Speaker 14 allows output of audio files. Printer 15 allows a user to print text, images, and the like, under user control from computing equipment 1.

Computing equipment 1 further includes a computer-readable memory medium such as computer disk 16. As shown in further detail below in connection with FIG. 2, computer disk 16 shows a windowing operating system, application programs such as a multimedia object management application according to the present invention, data files such as database files used by the multimedia object management system of the invention, audio files, text files, image files, video clip files, and the like. Under control of the windowing operating system, and pursuant to user commands, application programs are launched so as to allow a user to generate files, manipulate and store those files on disk 16, view and manipulate image files on display screen 4, create and store audio files, create and store video clip files, all in accordance with computer executable process steps which together comprise the multimedia object management application.

For ease of reference, the multimedia object management system according to a representative embodiment of the invention will hereinafter be referred to as "MOMA".

Figure 2:
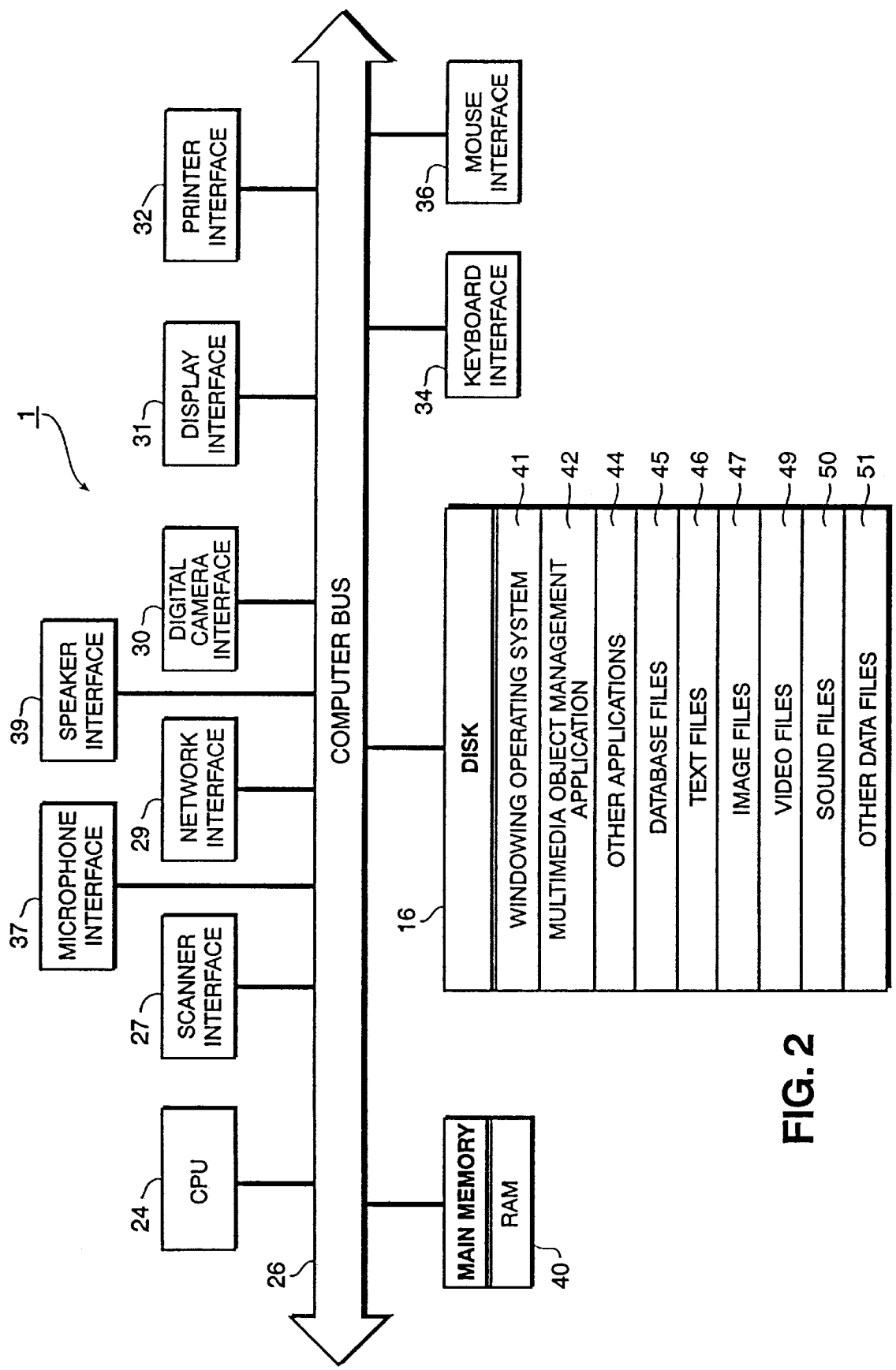
FIG. 2 shows the internal construction of computing equipment of FIG. 1.

FIG. 2 shows the internal construction of computing equipment 1. As shown in FIG. 2, computing equipment 1 includes a central processing unit (hereinafter "CPU") 24 such as an Intel Pentium 2 processor interfaced with computer bus 26. Also interfaced with computer bus 26 are scanner interface 27, network interface 29, digital camera interface 30, display interface 31, printer head interface 32, keyboard interface 34, mouse interface 36, microphone interface 37, and speaker interface 39. Each of these provides an interface between computing equipment 1 and respective hardware devices.

Main memory 40 provides random access memory ("RAM") storage for use by CPU 24 when executing application programs, such as the MOMA application program noted above. More specifically, during execution of an application program, CPU 24 loads those application programs from disk 16 to main memory 40 and executes the application programs out of main memory 40. In this regard, it is conventional under the windowing operating system of computing equipment 1 for the operating system to swap in and out of memory from disk 16.

Stored on disk 16 are process steps for windowing operating system 41, process steps for the MOMA application 42, and process steps for other applications 44. In addition, disk 16 stores database files 45, text files 46, image files 47, video files 49, sound files 50 and other data files 51, all for use by the application programs and the windowing operating system.

Although a programmable general purpose computer arrangement is shown in FIGS. 1 and 2, it will be understood that a dedicated or stand-alone computer, or other type of computing equipment can be used in the practice of the present invention.

[1.0 Architecture of MOMA]

MOMA is a media object management application designed to help users to organize and manage image/media files with associated properties such as file name, file format, keyword, comments, date, time, and file size, all of which the user can use to sort and search, and create subsets of, related media file by using specified criteria. The media database management system is based on the Microsoft Jet database engine. Images/media files can be stored anywhere in the file system. The database tracks changes to all Albums in a MOMA.mdb file in the same directory as the MOMA application itself.

Using MOMA, a user can create Collections, with each collection having one or more Albums. A user can add and delete individual members of Albums, and access TWAIN compatible devices to capture and add images to an Album.

Each media file is considered a member of a particular Album and each Album belongs to a collection that has some customized attributes. The user can store the media file itself anywhere on the file system, on removable media, on the user's network server, or on the Internet.

MOMA organizes all existing albums in a vertically arranged menu of icons, shown and described below in connection with FIG. 6. Each menu icon represents a collection of albums with some customized attributes. In each collection, the user can create many albums that can be opened in one of three views: Notebook, Spreadsheet, and Thumbnail view. The Thumbnail view, the default, presents thumbnail images for each member of an Album. The Notebook view presents a thumbnail image along with complete database information for that member. The Spreadsheet view presents just the text information for each of the members of an Album in row and column format. The spreadsheet can be sorted by clicking any of the column fields. In addition, pop-up thumbnails are displayed as the user navigates the mouse pointer over non-text spreadsheet entries, so as to provide the user with quick insight into the contents of non-text fields.

Figure 3:
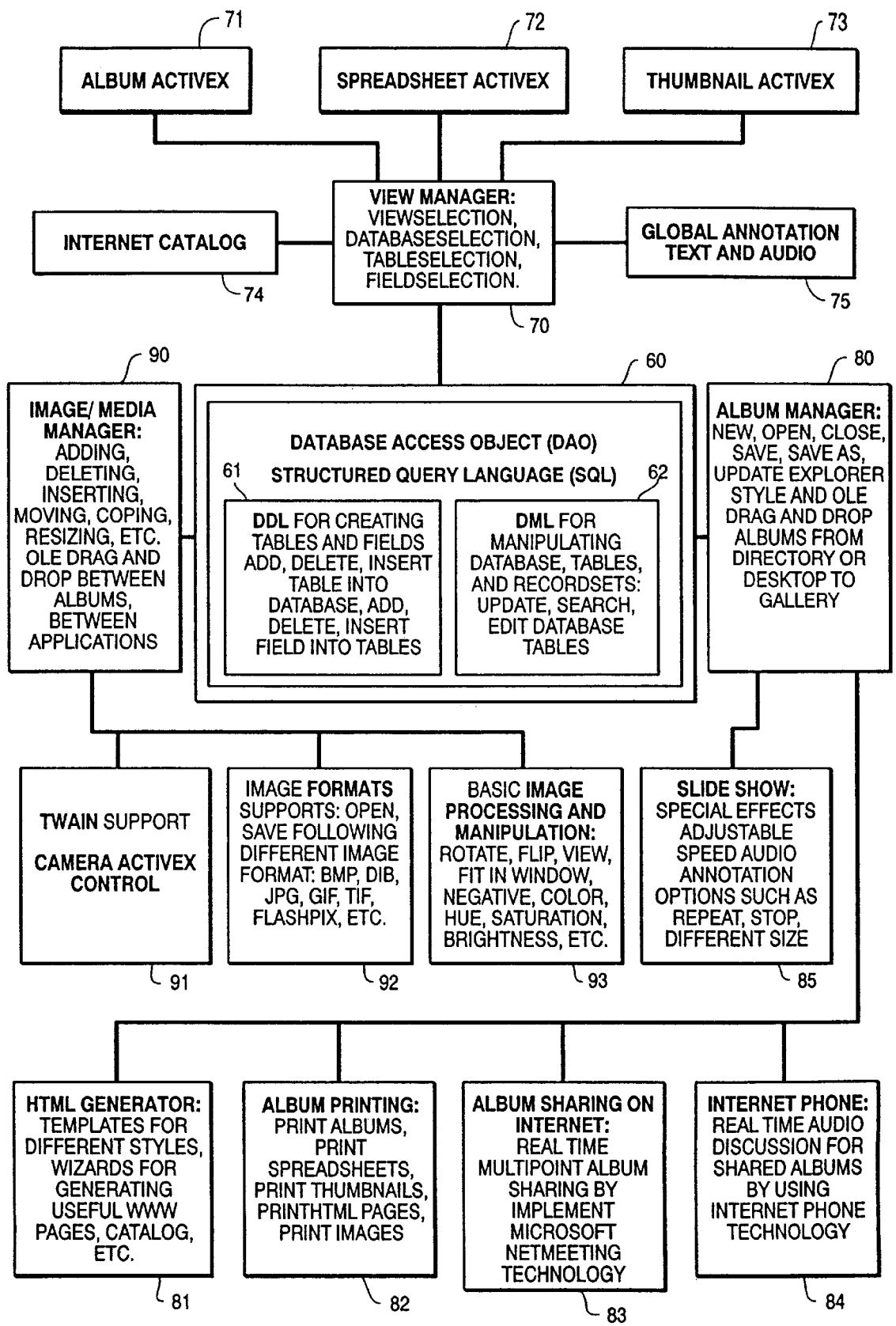
FIG. 3 shows the overview of the object structure of the multimedia object management application (MOMA) of the present invention.

FIG. 3 shows the overview of the object structure of MOMA. As shown in FIG. 3, MOMA architecture includes a database access object 60, a view manager 70, an album manager 80, and an image manager 90. The core component of the system is the Data Access Object ("DAO"), which is the brain of the system where the information is stored and search engine resides. Surrounding the DAO are the three management components. View Manager 70 manages several different database view presentation ActiveXs, including the Album View ActiveX 71, the Spreadsheet View ActiveX 72, and the Thumbnail View ActiveX 73, Internet Catalog (HTML) generation 74, and the global text and audio annotation 75. Album manager 80 is the module designed for creating new album, opening existing album, closing existing album, saving albums, etc. Album manager 80 includes HTML generator 81, album printer 82, album sharing 83, internet phone 84 and slide show 85. Image manager 90 handles the importing of image/media file and generating attributes associated with each imported file. Image manager 90 includes TWAIN support 91, image format support 92, and basic image processing and manipulation routines 93.

Thus, to summarize, a system to manage multimedia objects includes a database access object, which creates database tables and fields, adds and manipulates tables into the database, and adds and manipulates fields within each table in response to structured query language inquiries, an image manager which adds, deletes, inserts, moves, crops, re-sizes, and manipulates images, an album manager which creates, opens, closes, saves and manipulates albums within the context of album collections, and a view manager which allows a user to choose from a view selection, a database selection, a table selection, and a field selection.

Figure 4:
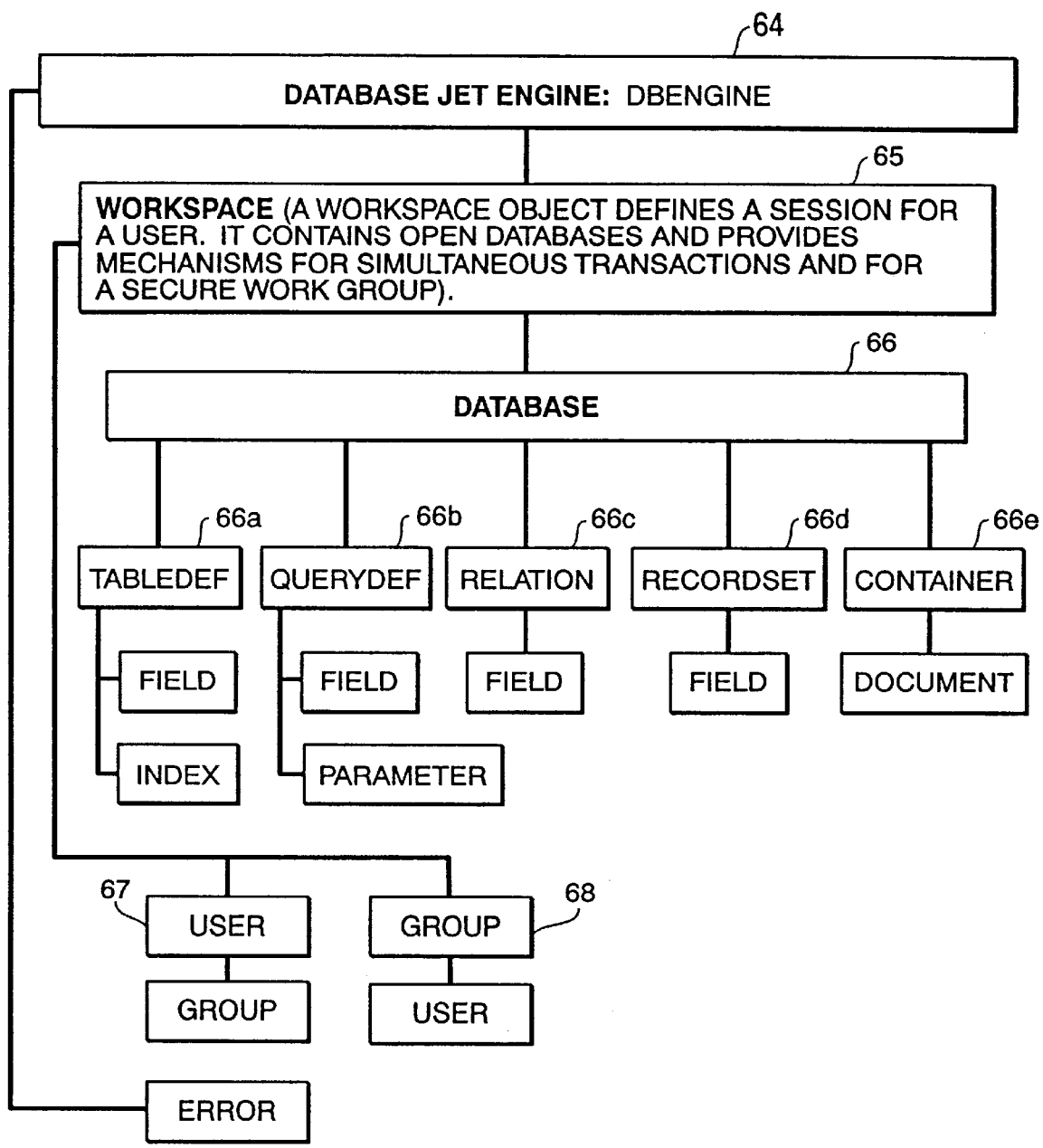
FIG. 4 is a class hierarchical view of the Microsoft database Jet engine.

FIG. 4 is a class hierarchical view of the database Microsoft Jet engine. The entire DAO hierarchy is illustrated. The data access object model is a hierarchy of classes that correspond to a logical view of a relational database system, such as the database itself, the tables defined in the database and the fields for each table, and indexes for each table. These classes are used to create data access objects that refer to the particular database we want to manipulate. The notion of an object hierarchy means that objects can contain other objects, which can in turn contain other objects. This "containment" is accomplished through a special kind of object called a collection object, which contains many objects that are the same kind.

Data Access object (DAO) 60 translates the GUI's request into actual database operation such as Add, Insert, Delete, Sort, Search, and Query on the stored media files. The database jet engine consists of two major components: the Data Definition Language (DDL) 61 and the Data Manipulation Language (DML) 62. DDL consists of those properties and methods of the Data Access Object (DAO) that can be used to define and create the database, inducing its tables, fields, index, relationships between different database tables.

DML consists of the DAO properties and methods for generating SQL language to query the database system, navigate through its tables, perform updates, and add or delete records of the created database system.

As FIG. 4 shows, most of the data access objects are represented as both "Object and Collection". At the top of the hierarchy is the Jet database engine itself, the DBEngine object 64. It is the only data access object that is not contained in anything. It owns a collection 65 called Workspace, which contains one or more Workspace objects, such as Table Def objects 66a which define database tables as described below in Section 2.0, Query Def objects 66b which define user queries, relation objects 66c which define relations between database entries, Record Set objects 66d, and Container objects 66e. The Workspace 65 further contains User 67 and Group 68 objects which define network connectivity and access.

[2.0 Database Tables]

MOMA uses Microsoft Access database for storing all information associated with albums and images. The Jet Engine is used to define and manipulate the database by using the Database Access Object (DAO). Most of the search, sort, query functions are implemented by using DAO Search Query Language ("SQL") statements. Some of the search related function may be implemented by using DAO object only.

Figure 5:
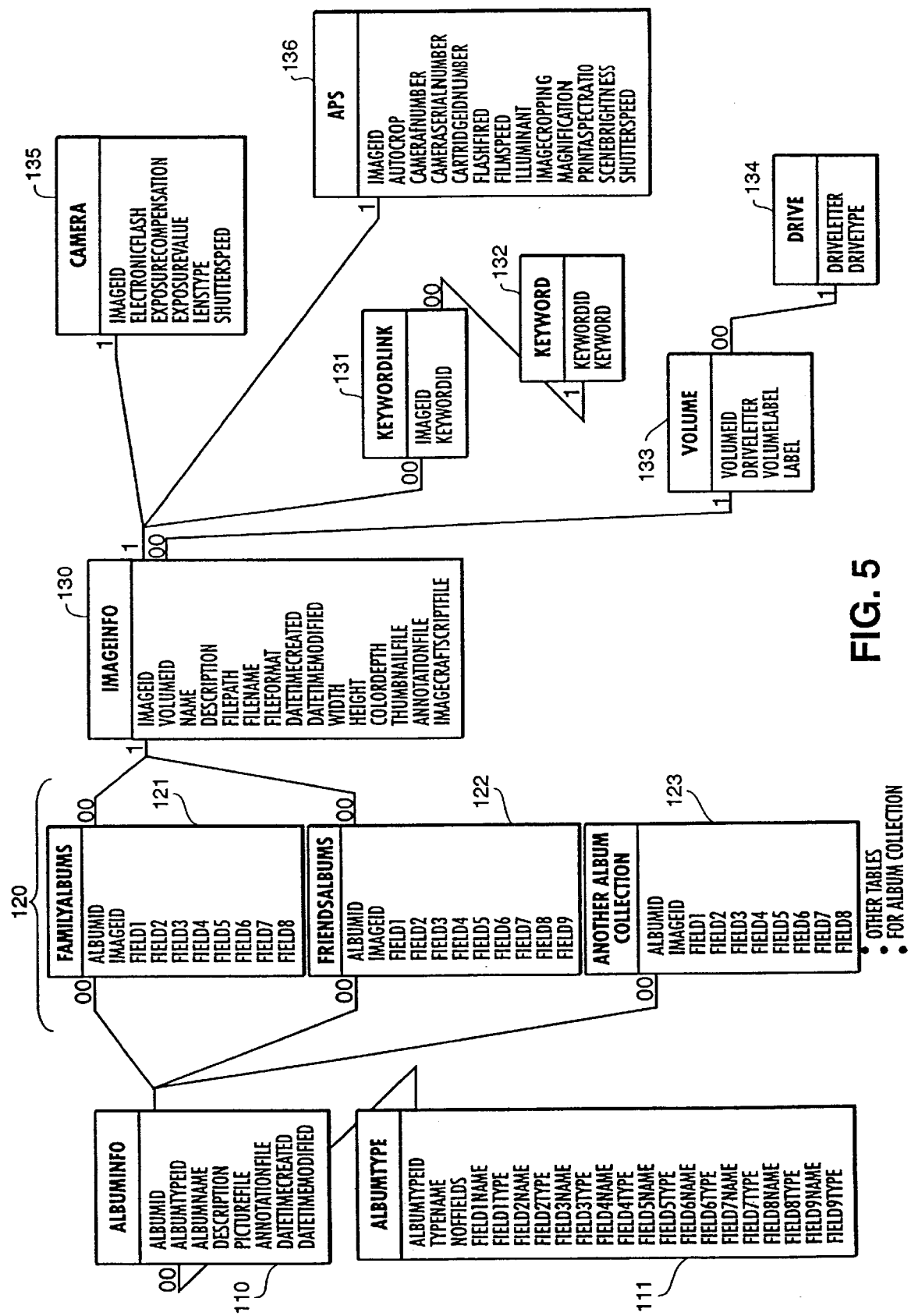
FIG. 5 is a view for explaining database tables used in MOMA.

As illustrated in FIG. 5, the database tables used in MOMA consist of three major different kinds of tables: the AlbumInfo Table 110, Album Collection Tables 120, and ImageInfo Table 130.

AlbumInfo Table 110 is associated with the AlbumType table 111 and is connected with all of the Album Collection Tables 120.

A different Album Collection Table 120 is provided for each different collection of albums. FIG. 5 depicts tables for two different album collections, a Family Album table 121 which stores information for one or more albums contained in a collection entitled "Family", and a Friends Album table 122 which stored information for one or more albums contained in a collection entitled "Friends". Tables for each other collection of albums being managed by MOMA are provided, as illustrated at 123 and so on.

The fields contained in each different collection are user-customizable, and may therefore differ from collection to collection. Each time a user creates a new collection of albums, a new Album Table 120 will be created.

Associated with the ImageInfo Table 130 are KeywordLink 131, Keyword 132, Volume 133, Drive 134, Camera 135, and APS 136 attributes table. Keyword link tables 131 and 132 allow a user to select keywords from an existing keyword list or to create new keywords for each image added to the application. The Volume and Drive table 133 and 134 are designed to keep track of all the image import sources such as APS, Camera, Hard Disk, ZipDrive, Network Drive, PhotoCD, Internet URL Connection, etc.

The Camera attributes table 135 is specifically designed for storing information created by Canon Powershot® camera. The APS attributes table 136 holds the properties from Canon Advanced Photo System.

All of the database fields are summarized in Table 1. Table 2 gives some representative fields for default album collections, although as noted above, each new collection can be defined by the user with user-customizable fields.

TABLE 1

Summary of all database field name and type

| Table Name | Field Name | Field Type | Description |
|---|---|---|---|
| AlbumType | AlbumTypeID | Integer | AutoNumber unique |
| | TypeName | Text | Name of the type of albums (unique) |
| | NotFields | Number | The total number of custom fields |
| | Field1Name | Text | Name of customized field #1 |
| | Field1Type | Text | Type of customized field #1 |
| | . . . | . . . | . . . |
| | Field20Name | Text | Name of customized field #20 |
| | Field20Type | Text | Type of customized field #20 |
| AlbumInfo | AlbumID | Integer | Primary key (auto incremented) |
| | AlbumTypeID | Text | Foreign key from AlbumType table |
| | AlbumName | Text | Unique album name for each album |
| | Description | Memo | Up to 32k characters can be used |
| | PictureFile | Text | Picture file path for each album |
| | AnnotationFile | Text | Audio annotation file path |
| | DateTimeCreated | Date/Time | Album created date |
| | DateTimeModified | Date/Time | Album modified date |

TABLE 1-continued

Summary of all database field name and type

| Table Name | Field Name | Field Type | Description |
|---|---|---|---|
| Album Collection Tables | AlbumID | Integer | Foreign key from table AlbumInfo; Primary key together with ImageID field |
| | Image ID | Integer | |
| | Customized Field 1 | Text | The user can customize up to maximum 20 fields. |
| | ... | ... | |
| | Customized Field N | Text | Each time the user creates a new type (collection) album, a new table will be created. |
| ImageInfo Media file Info | ImageID | Integer | Primary key (auto incremented) |
| | VolumeID | Integer | Foreign key from RemovableStorage table |
| | Name | Text | Name for the image |
| | Description | Memo | Description up to 32k characters |
| | Filepath | Text | Directory/subdirectory |
| | FileName | Text | File name with extension |
| | FileFormat | Text | File format such as "BMP", "JPG", "GIF", etc. |
| | DateTimeCreated | Date/Time | Date/time when the image created |
| | DateTime Modified | Date/Time | Date/time when the image modified |
| | Width | Integer | Width of the image in pixels |
| | Height | Integer | Height of the image in pixels |
| | ThumbnailFile | Text | File path and name of the thumbnail |
| | AnnotationFile | Text | Audio annotation file path and name |
| | ImageCraftScriptFile | Text | Script file path and name created by Canon ImageCraft |
| Keyword | ImageID | Integer | Image ID number |
| | KeywordID | Integer | Keyword ID number |
| KeywordLink | KeywordID | Integer | Keyword ID number |
| | Keyword | Text | The actual key word name |
| Volume | VolumeID | Integer | Primary key index number |
| | DriveLetter | Text | C, D, E, etc. |
| | VolumeLabel | Text | Unique ID of each storage PhotoCD, Camera, etc. |
| | Label | Text | Label on storage media |
| Drive | DriveLetter | Text | C, D, E, etc. |
| | DriveType | Text | Uniquely specify the type of storage media such as PhotoCD, APS, Camera, etc. |
| Camera | ImageID | Integer | Primary key for connection with ImageInfo table |
| | ElectronicFlash | Yes/No | Yes - with Flash No - without Flash |
| | ExposureCompensation | Integer | ? |
| | ExposureValue | Integer | Exposure value used by camera |
| | LensType | Text | Lens zoom range/ f number |
| | ShutterSpeed | Integer | Speed of shutter |
| APS | ImageID | Integer | Primary key |
| | Autocrop | Text | Special camera records location of subject on film (?) |
| | Camera f number | Integer | Aperture value |
| | Camera serial number | Text | Serial number of camera |
| | Cartridge ID number | Text | File cartridge serial number, used for path info as well |
| | Flash fired | Yes/No | Yes - with flash No - without flash |
| | Film Speed | Integer | Speed of film emulsion |
| | Illuminant | Text | Camera records scene |

TABLE 1-continued

Summary of all database field name and type

| Table Name | Field Name | Field Type | Description |
|---|---|---|---|
| | | | illumination |
| | ImageCropping | Text | (x1, y1, x2, y2) |
| | Magnification | Text | Zoom of camera |
| | Print Aspect Ratio | Text | C, H, or P |
| | Scene brightness | Integer | Four levels of scene brightness |
| | Shutter speed | Integer | Speed of shutter |
| | User Select Title | Text | Title imprinted by camera |

TABLE 2

Representative Album Collection Tables

| Album Collection | Field Name | Field Type | Description |
|---|---|---|---|
| Family | First Name | Text | |
| | Last Name | Text | |
| | Address | Text | |
| | City | Text | |
| | State | Text | |
| | Zipcode | Integer | |
| | Country | Text | |
| | Home Phone | Text | |
| | Office Phone | Text | |
| | Fax No. | Text | |
| | Email | Text | |
| | Date of Birth | Date/Time | |
| Real Estate | List Price | Currency | |
| | Sale Price | Integer | |
| | Number of Rooms | Integer | |
| | Square Footage | Text | |
| | House Style | Text | |
| | Address | Text | |
| | City | Text | |
| | State | Text | |
| | Zipcode | Integer | |
| | Agent | Text | |
| | Agent Phone | Text | |
| | Agent Fax | Text | |
| Album for Photographer | First Name | Text | |
| | Last Name | Text | |
| | Subject | Text | |
| | Location | Text | |
| | Date | Date/Time | |
| | Camera | Text | |
| | Lens | Text | |
| | Filter | Text | |
| | Aperture | Text | |
| | Shutter Speed | Text | |
| | Film Type | Text | |

[3.0 MOMA GRAPHICAL USER INTERFACE (GUI)]

When the user starts MOMA, it opens its main window, which is the container (parent window) of all child windows. While other implementations are possible, the implementation given here is preferred for the Windows 98 Multi Document Interface (MDI) standard so that all of the child windows are contained by the MDI parent window.

Figure 6:
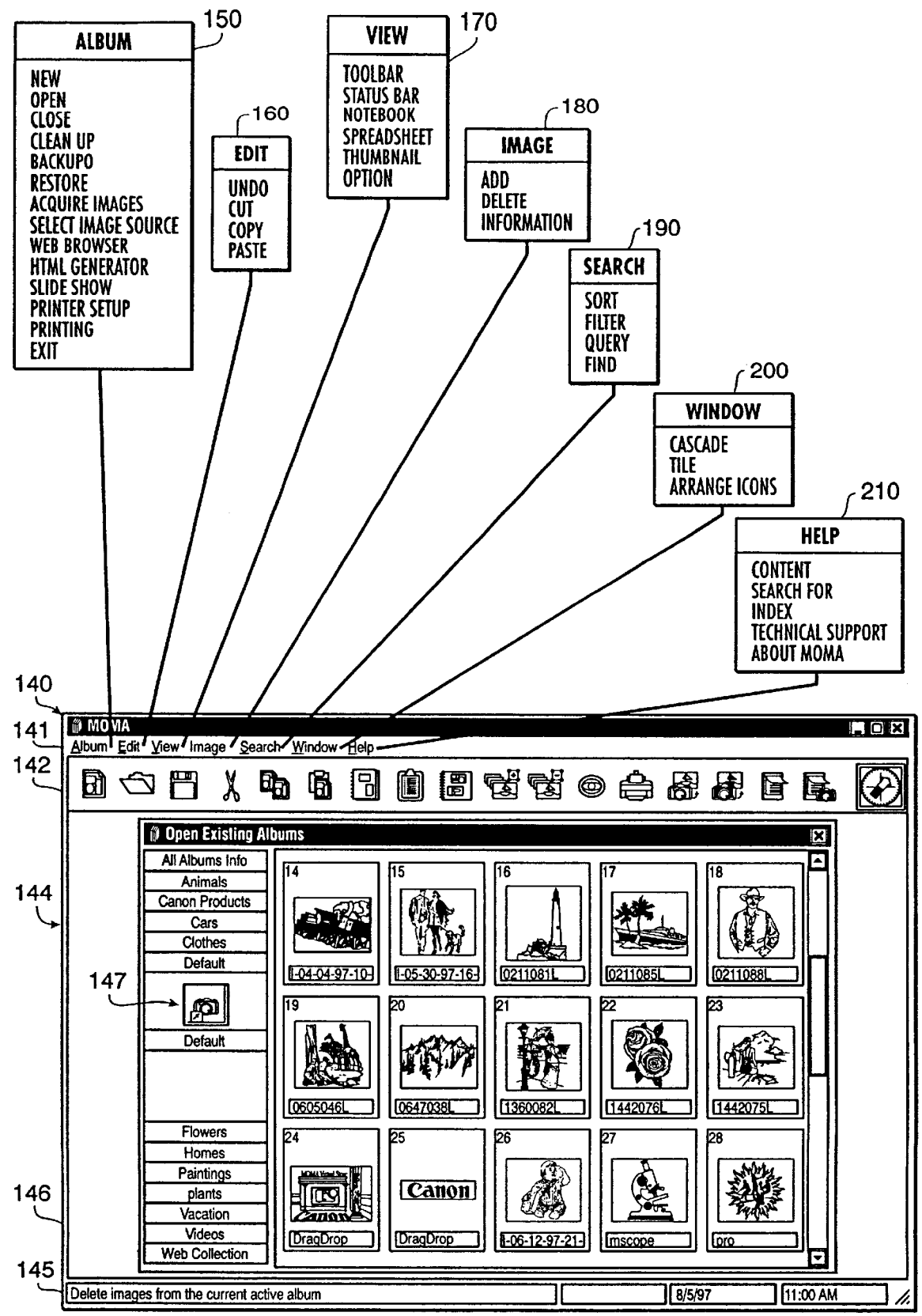
FIG. 6 shows the user interface for the MOMA main window.

FIG. 6 shows the MOMA main window 140. As shown in FIG. 6, main window 140 includes a menu bar 141, a toolbar 142, an MDI client area 144, and a status bar 145. Available selections on menu bar 141, which are discussed extensively below, are shown in the insets for FIG. 6, and include Album 150, Edit 160, View 170, Image 180, Search 190. Window 200 and Help 210. Buttons on toolbar 142 allow direct access to items in the menu bar 141. Client area 144 is where MOMA displays its user interfaces and allows a user to work. Status bar 145 gives current status of MOMA, as well as text-based descriptions of menu selection.

Menu bar 141 has two modes: album and image mode. The default mode is the album management menu. When the user works with an image window, this menu changes to image mode. Toolbar 142 lets the user work with both albums and images. Status bar 145 reflects the current tool or operation.

When the user starts MOMA, the "open existing album windows", described below in Section 3.1.2, is opened as the default and displayed in client area 144. All of the existing albums will be listed in the vertical menu 146. The first vertical menu is "All Albums Info" menu. Each icon (or button) in menu 146 corresponds to a collection of albums. By clicking "All Albums Info" menu, the user can view information about the collection such as album names, collection names, description about the albums, date/time created, date/time modified, and the icon file name that represents the created album.

The remainder of the vertical menu represents the collections created by the user. By clicking any of the vertical menus, the user can view all of the albums created under each of the collections. Each album is represented by a double clickable icon such as icon 147. The user can create as many albums as he/she wants. If there isn't enough space for displaying all of the created album icons, two scroll buttons will be displayed for the user to scroll up and down to browse all of the albums that belong to the same collection.

Figure 7:
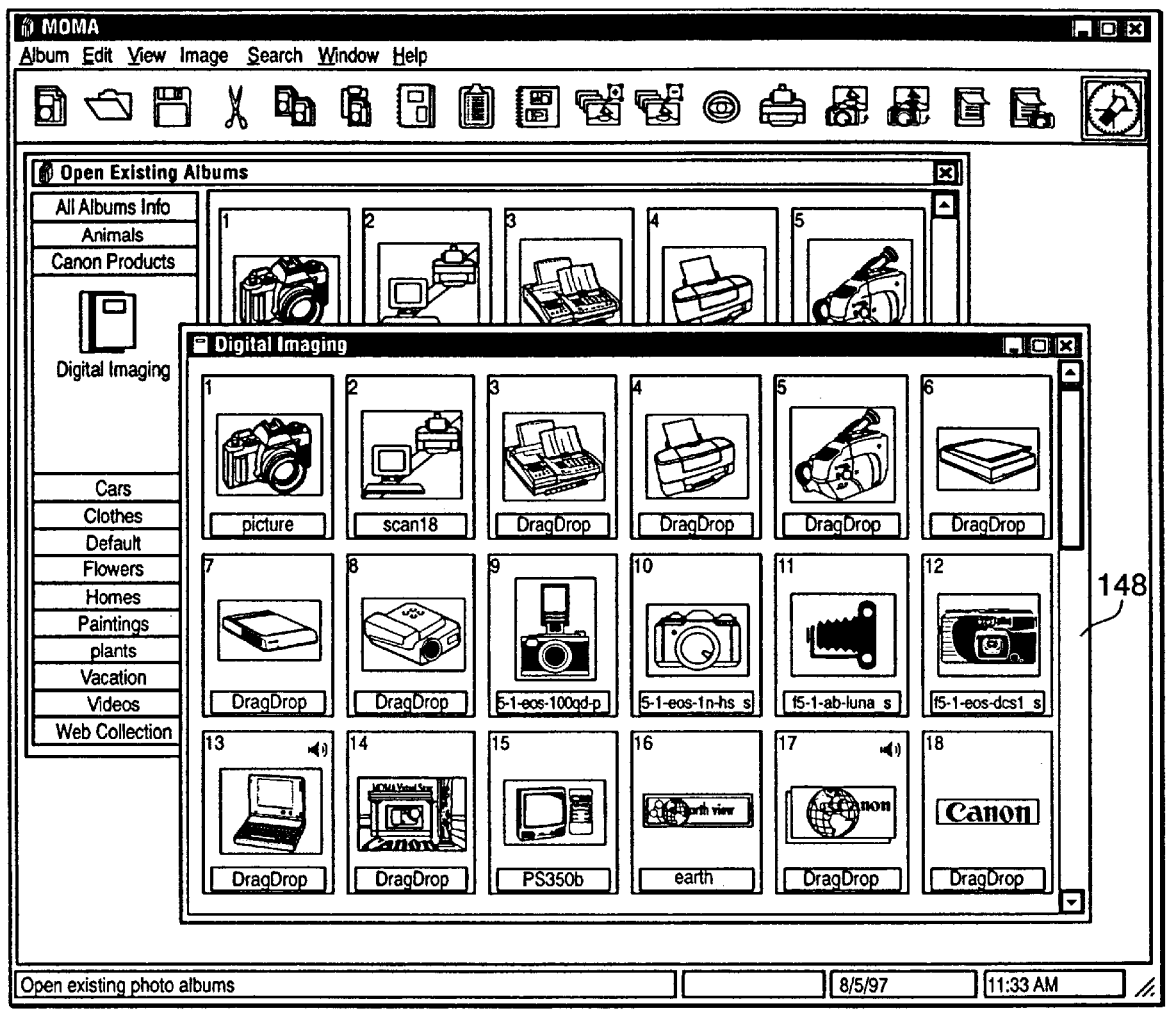
FIG. 7 is a view showing the user interface for the "Album" option.
Figure 8:
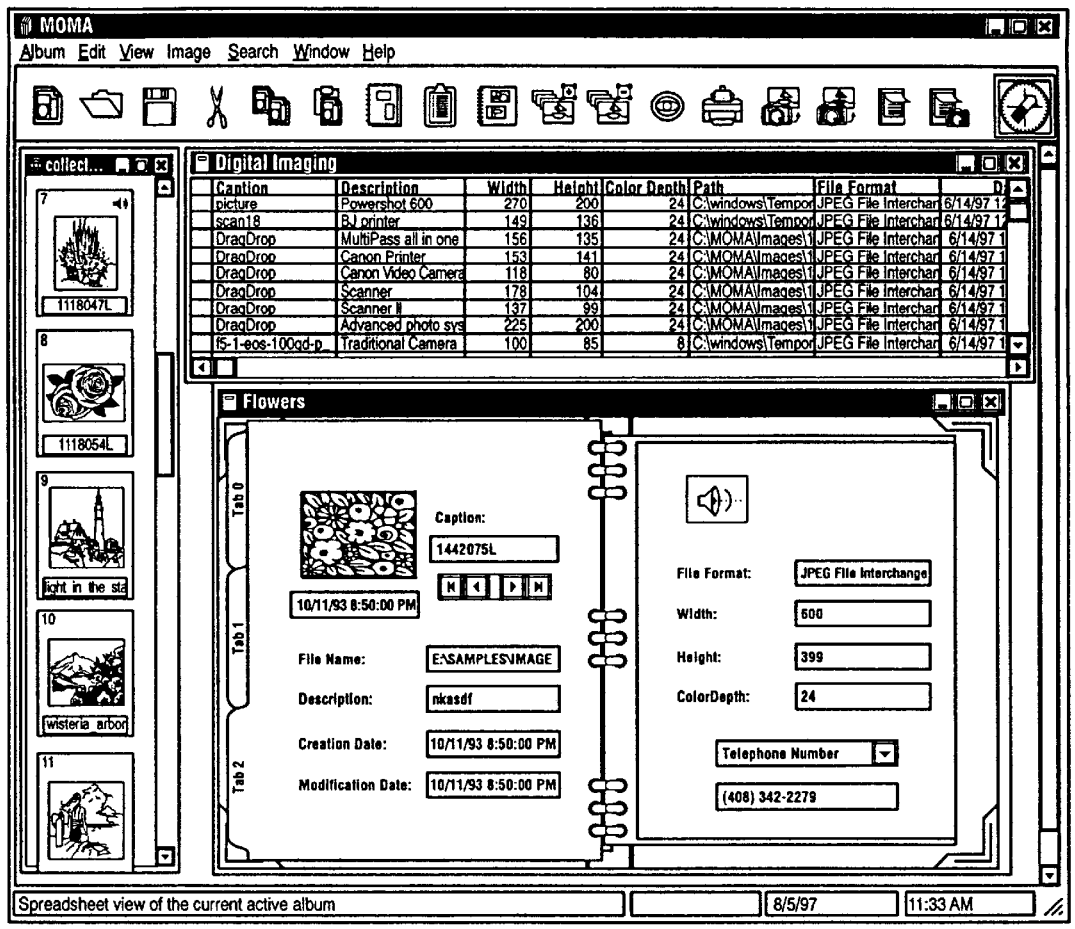
FIG. 8 is a view showing three different user interfaces for a Thumbnail view, a Notebook view, and a Spreadsheet view.

By single clicking the album icon, the user can preview the currently selected album. The user can open the selected album by double clicking the album icon button as shown at 148 in FIG. 7. Once the album is opened, the user can view the album in three different views as shown in FIG. 8: Thumbnail view, Notebook view, and Spreadsheet view. Each view is discussed below in Sections 3.3.2, 3.3.3, and 3.3.4.

A detailed explanation now follows of each of the menu items in menu bar 141.

[3.1 "Album" Menu]

The Album menu 150 consists of the following menu items: New; Open; Close; Clean up; Backup; Restore; Acquire Images; Select Image Source (e.g., cameras or scanners); Web Browser; HTML Generation; Slide Show; Printer Setup Printing; and Exit.

[3.1.1 "New"]

Figure 9:
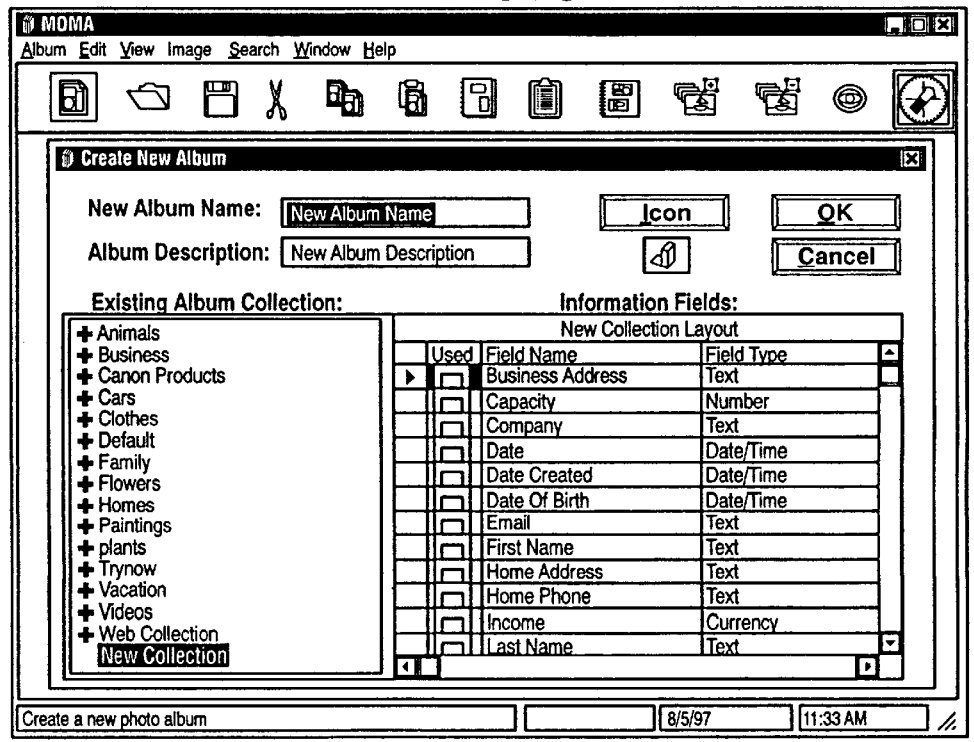
FIG. 9 shows a user interface for a "Create New Album" pop-up dialog box.

When a user clicks the "New" button or selects "New" from the album menu or presses "Ctrl+N", the "Create New Album" dialog box shown in FIG. 9 will pop-up. The user needs to enter the new album name and type in a brief description about the album. One the left side of the list view, the user can either select an existing collection to create the album or click the new collection button to create a new collection. If the user selects an existing album collection, the associated attributes will be displayed on the right hand side of the dialog box. If the user chooses to create a new collection, a set of default attributes will be displayed on the right hand side of the dialog box. The user can select any of the fields by highlighting the row and clicking the check box. If the user wants to edit the selected field name, just click the field name to edit and click the field type to select an appropriate field type. The current supported field types are Text, Number, Currency and Date/Time.

[3.1.2 "Open"]

Figure 10:
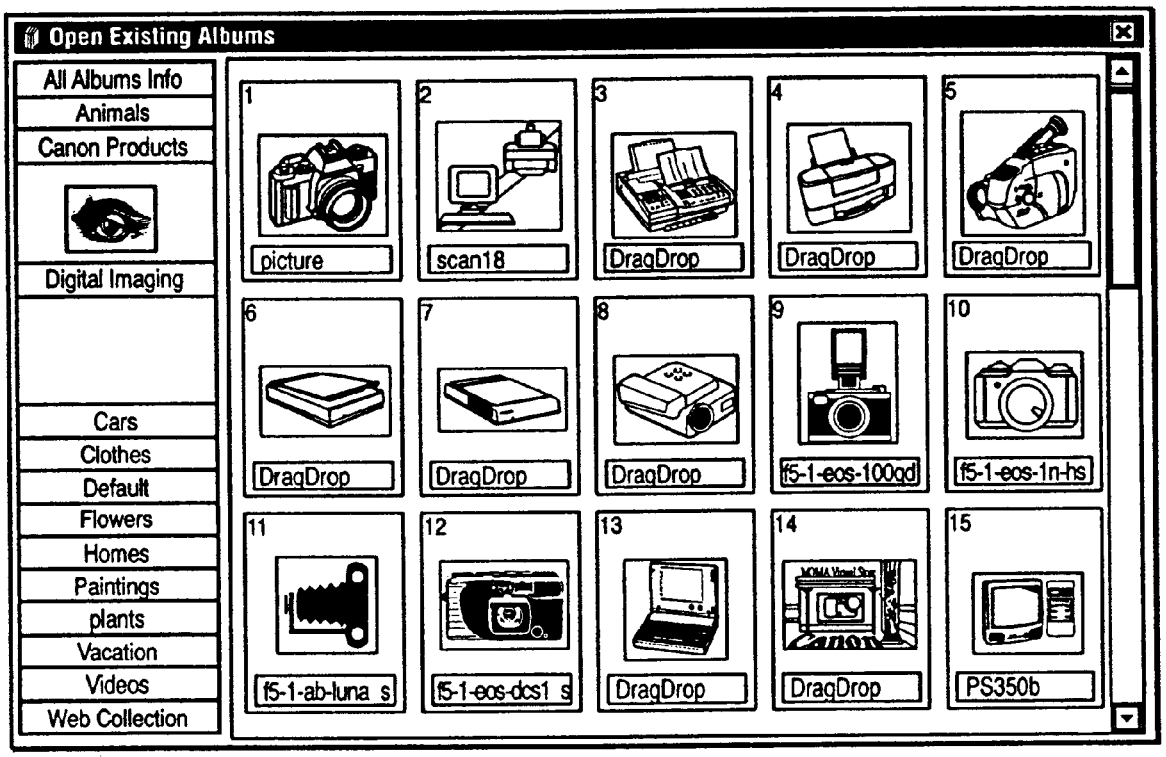
FIG. 10 shows a user interface for a "Open Existing Album" window.

When a user selects this menu, or clicks the open button, the "Open Existing Album" window shown in FIG. 10 will be popped up for the user to select an existing album to open. As described above in connection with FIG. 6, the window consists of a left side vertical menu and a right side preview window. The user can click any of the left side vertical menus to select each existing album collection, and click each icon to preview the selected album.

The first vertical menu item is by default the place where the user can view all of the information associated with each created album. The common attributes for all of the collections and albums are Album Name; Collection Name; Description for each album; Date/Time that album was created; Date/Time that album was modified; and Icon file name and path for the album. The existing albums can be sorted by clicking any of the columns.

[3.1.3 "Close"]

Closes the currently active window.

[3.1.4 "Acquire"]

Displays the TWAIN user interface for the selected TWAIN devices such as digital cameras and scanners.

[3.1.5 "Select Image Source"]

Displays the TWAIN image input source list dialog box so that the user can select a TWAIN compliant device such as digital camera and scanner.

[3.1.6 "Clean Up"]

Cleans the whole MOMA database system. The database "Clean Up" consists of the following functions:

1. Ask the user if he/she wants to delete all files in the default album. If the user's answer is "Yes", empty the DefaultCollection table in the MOMA database.

2. Make sure the Drive Table of the MOMA database system is consistent with the current computer system drives. For each drive in the DriveListBox, check if it is included in the Drive Table. If it is not included, call WinAPI to get the type of the drive and add a record to the Drive Table.

3. For each of the empty albums, pop up the dialog box to ask the user if he/she wants to delete the empty album from the collection.

4. For each of the empty collections, pop up the dialog box to ask the user if he/she wants to delete the empty collection.

5. For each album in the MOMA database, recreate the thumbnail PCX multipage file so that the page index number and the thumbnail view order can be updated. This is necessary due to the constant modification activities such as add, delete, drag and drop, copy, paste, etc.

6. For each image file in the ImageInfo table of the MOMA database, check if it is used by any of the existing albums. If it is not used by any of the existing albums, delete it from the ImageInfo table and delete the audio annotation file associated with this image.

7. Check if any of the keywords in the keyword table is not used by any of the album images. If not, delete it from the keyword table.

8. For each file in the ImageInfo table, if DriveType is fixed, check if the image file actually exists on the drive. If not, pop up the dialog box to ask the user if he/she wants to supply new paths or file name for the missed file. This check is necessary when the user changes the file name, or moves the images to a different location.

[3.1.7 "Backup"]

Copies the MOMA.mdb file from the application directory and all PCX files for all of the created albums from the "thumbnail" sub-directory to the "Backup" sub-directory under the application directory.

Preferably, a dialog box is implemented to allow the user to specify where to save the backup.

This dialog allows the user to perform the following backup steps:

1. Select the album the user wants to backup.
2. From the Album menu, choose "Backup.
3. Select the drive and folder for the album's backup. (All the original files in the selected folder will be removed first and then replaced with the backups.)
4. Click OK to create the backup.

[3.1.8 "Restore"]

Copies the MOMA.mdb file from the "Backup" sub-directory to the application directory, and copies all associated PCX files for all of the created album from the "Backup" sub-directory to "thumbnail" sub-directory under the application directory.

Preferably, a dialog box is implemented to allow the user to specify what to restore back to the application directory. This dialog allows the user to perform the following restore steps:

1. Select the album the user wants to restore.
2. From the Album menu, choose "Restore".
3. Click OK to create the restore.

[3.1.9 "Web Browser"]

Figure 11:
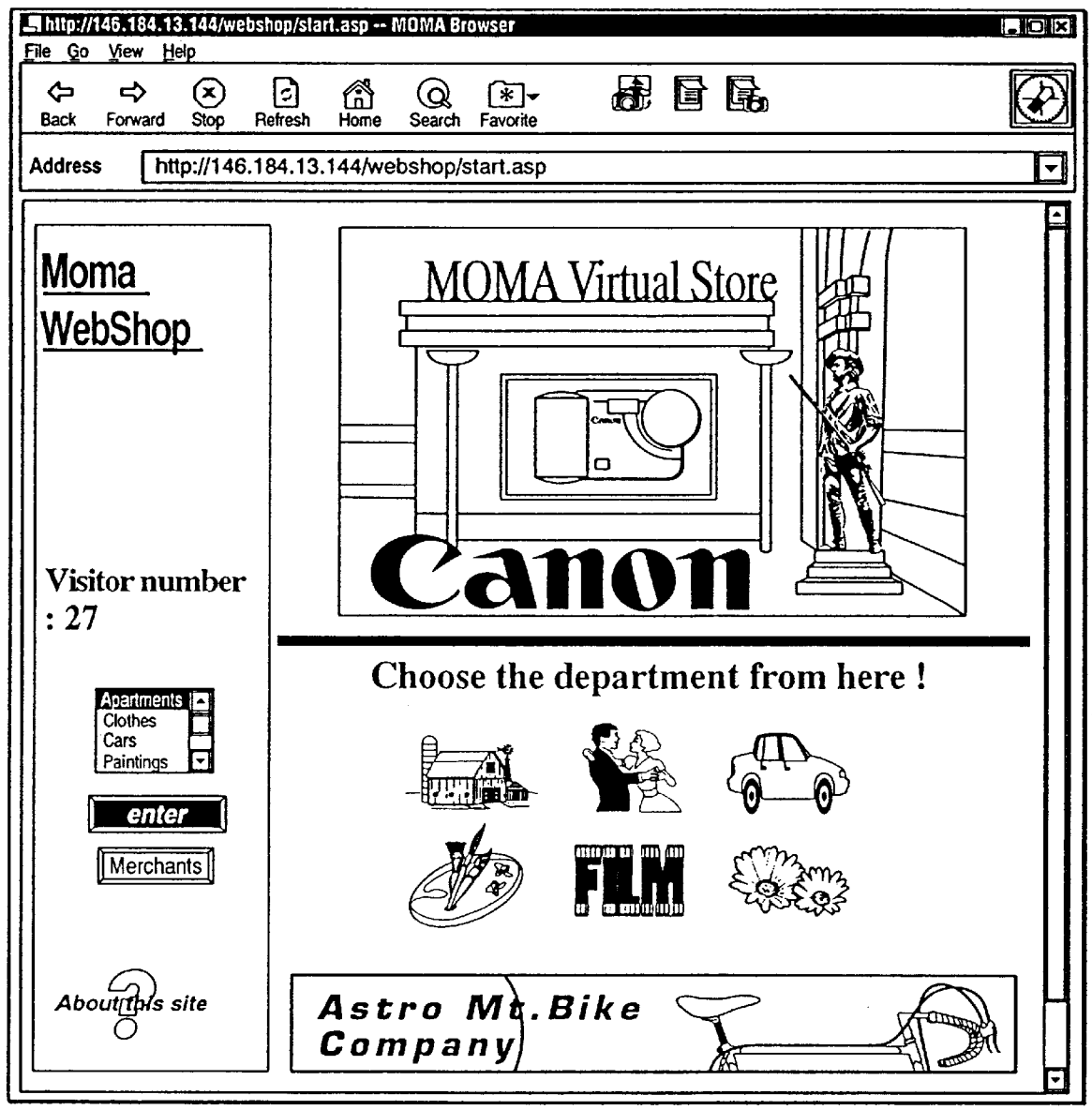
FIG. 11 is a preferred user interface screen for a web browser.

The web browser is implemented by using the Microsoft WebBrowser ActiveX control. Since this browser is mainly implemented for MOMA internal use, it preferably provides simplified browser features. The following commonly used features are implemented in the MOMA browser: Back; Forward; Stop; Refresh; Home and Search. A preferred user interface is shown in FIG. 11.

[3.1.10 "HTML Generator"]

Initializes the HTML web page generation wizards described below in Section 3.1.14.2.1, with step by step guide to walk the user through the HTML export process. The Web page generator will generate home pages that are HTML standard compatible, and can be viewed by the most popular browsers such as Netscape Navigator and Internet Explorer.

[3.1.11 "Album Slide Show"]

Allows user to view the album contents in term of slide show with the following control options:

number of special effects adjustable slide show speed slide show with audio annotation selectable options such as repeat, stop, re-size image, etc.

[3.1.12 "Printer Setup"]

The printer setup is a standard Windows COMMDLG.DLL printing setup dialog box in terms of selecting existing printer, print page range, number of copies, and setting the printer properties.

[3.1.13 "Exit"]

Exits the MOMA application.

[3.1.14 "Print"]

Print functionality, and more generally output functionality, is provided under the "print" option. Output functionality preferably includes:

1. Basic functionality to generate simple printed photo albums and HTML files.

2. Additional templates and graphical enhancements (frames, borders, etc.) for more elaborate and formatted outputs.

3. Templates for specific vertical markets, such as real estate, inventory control, catalog sales, and the like.

4. Output editor developed for enabling advanced customization by users and VAR's.

In MOMA, "printer" is conceptualized as either of printing a hard paper copy, or generating and outputting HTML files for publication on the World Wide Web. In either case, i.e., hard copy printout or HTML generation, templates guide the layout and organization of resulting output. MOMA further provides "wizards" to aid the user in design, use and storage of appropriate templates, as described below.

[3.1.14.1 "Print Album"]

Figure 12:
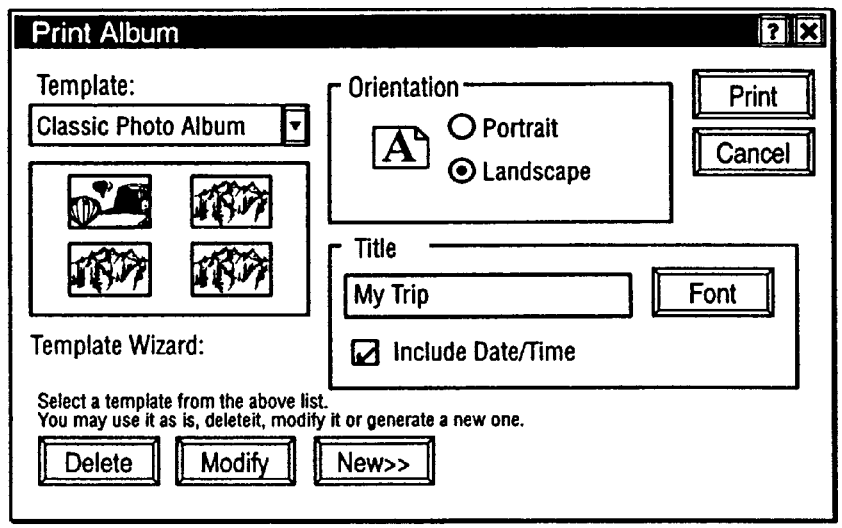
FIG. 12 is a view showing a user interface for the "Print Album" dialog.

When the user selects "Print Album" the dialog shown in FIG. 12 appears. The user can select a pre-defined template or create a new one using the template wizard. A preview of the selected template is shown. Photos in the template are samples only. Templates are stored internally in the MOMA database. The user can delete or modify the selected template or select "New" to create a new template setting. If "Delete" is selected, an "Are you sure?" dialog is displayed. If the user selects "Modify", the dialog proceeds to the template wizard sequence described below with the existing template settings displayed as a starting point. The existing template may be modified accordingly and re-saved with the new settings if the user so desires. If "New" is selected, the dialog proceeds through the wizards using the default settings as a starting point and a new template can be saved if the user so desires.

This dialog also lets the user set the page orientation and the header/footer. The header is set as a title centered on the top of the page. The font for the title can also be defined including typeface, style, size and color. The footer is simply the print date and time and is printed on the lower, right hand corner of each page (10 point Arial font, date/time format determined from country code) if the checkbox is selected.

If the user wants to proceed with the selected template, they press "print" and the printing commences.

The basic installation will include a set of 5–8 pre-defined templates, including:

Plain Photo Album (4 per page)—default

Classic Photo Album (4 per page with boarders and background)

Kids Photo Album (8 per page "Sticker Book" style)

Flyer (1 per page with first 6 data fields as default)

Catalog (2 per page, diagonal with first three data fields as default)

Others to be determined

A template wizard, described below, allows a user to customize and/or modify templates as desired.

[3.1.14.1.1 "Printing Template Wizard—Page Layout"]

Figure 13:
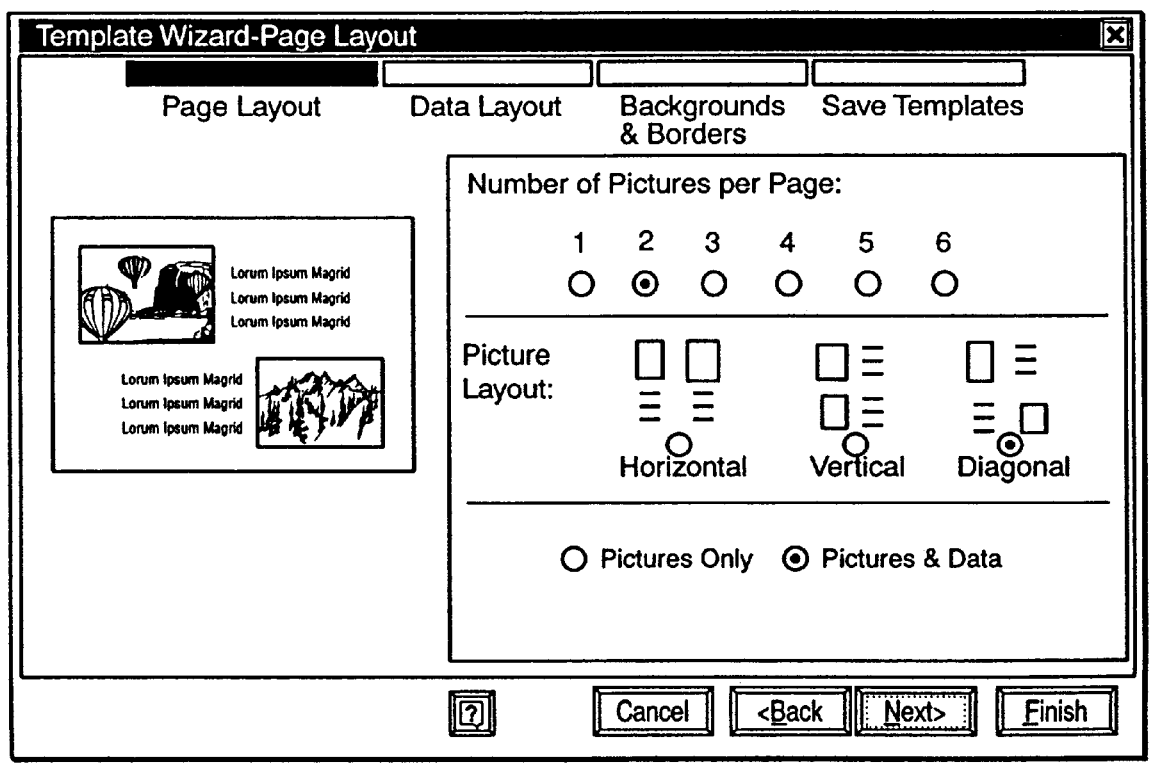
FIG. 13 is a view showing a user interface which allows a user to generate a new template or modify an existing template.

If the user selects to generate a new template or modify an existing template, the dialog shown in FIG. 13 starts the printing template wizard process. A guide across the top lists the steps in the wizard sequence and shows the user where they are in the process. This dialog allows the user to select the layout of the pictures on the page. As modifications are made to the settings, appropriate changes are made to the preview sample page. The orientation of the preview area is based on the portrait/landscape setting made in the page setup dialog.

The user can select how many pictures to display on the page. The selection can either be implemented as a series of radio buttons or a drop down. If the user has selected less than 6 pictures for printing, the non-applicable selections will be grayed out.

For the Picture layout, the dialog will show sketches of two pictures and three lines displayed side by side (horizontal), up and down (vertical), or diagonally. These sketches will not change based on the number of pictures per page. The preview will indicate the actual layout of hard copy, as summarized in Table 3.

TABLE 3

Hard Copy Layout

| Number of Pictures | Horizontal | Vertical | Diagonal |
|---|---|---|---|
| 1 | Image on top, text below | Image on left, text on right | Image in upper left corner, text in lower right corner |
| 2 | Two images across top, text below each | Two images down left of page, text to right of each | One image in upper left corner, associated text to right of it, next image in lower right, associated text to left of it |
| 3 | Three images across top, text below each | Three images down left of page, text to right of each | One image in upper left corner, associated text to right of it, next image in middle right, associated text to left of it, last image in lower left, text to right of it |
| 4 | (P) Two images across top, text below each, next two across middle, text below each. (L) Four images across top, text below each. | (P) Four images down left of page, text to right of each. (L) Two images down left side, text to right of each; next two down middle, text to right of each. | (P) One image in upper left hand corner, associated text to right, alternate down page. (L) Two columns: one image in upper left of column, text to right; next image in lower right of column, text to left. |
| 5 | (P) Two images across top, text below each, next three across middle, text below each. (L) Five images across top, text below each. | (P) Five images down left of page, text to right of each. (L) Three images down left side, text to right of each; next two down middle, text to right of each. | (F) One image in upper left hand corner, associated text to right, alternate down page. (L) Two columns: Left column: one image in upper left corner, associated text to right of it; next image in middle right, associated text to left of it; last image in lower left, text to right of it. Right column: one image in upper left of column, text to right, next image in lower right of column, text to left. |
| 6 | (P) Three images across top, text below each, next three across middle, text below each. (L) Six images across top, text below each. | (P) Six images down left of page, text to right of each. (L) Three images down left side, text to right of each; next three down middle, text to right of each. | (F) One image in upper left hand corner, associated text to right, alternate down page. (L) Two columns: one image in upper left corner, associated text to right of it; next image in middle right, associated text to left of it; last image in lower left, text to right of it. |

The selections for more than three images will vary depending on whether the page orientation is portrait (P) or landscape (L). Generally, for portrait, no more than three pictures will be placed across the width of the page, while up to six may go down the page; for landscape, no more than three will go down the page, but up to six may go across the page.

The last selection enables the user to decide if data fields from the MOMA database are displayed with each picture. If the user selects "Pictures and Data", the dialog in FIG. 13 above is shown and the next step in the process is the data layout dialog.

Figure 14:
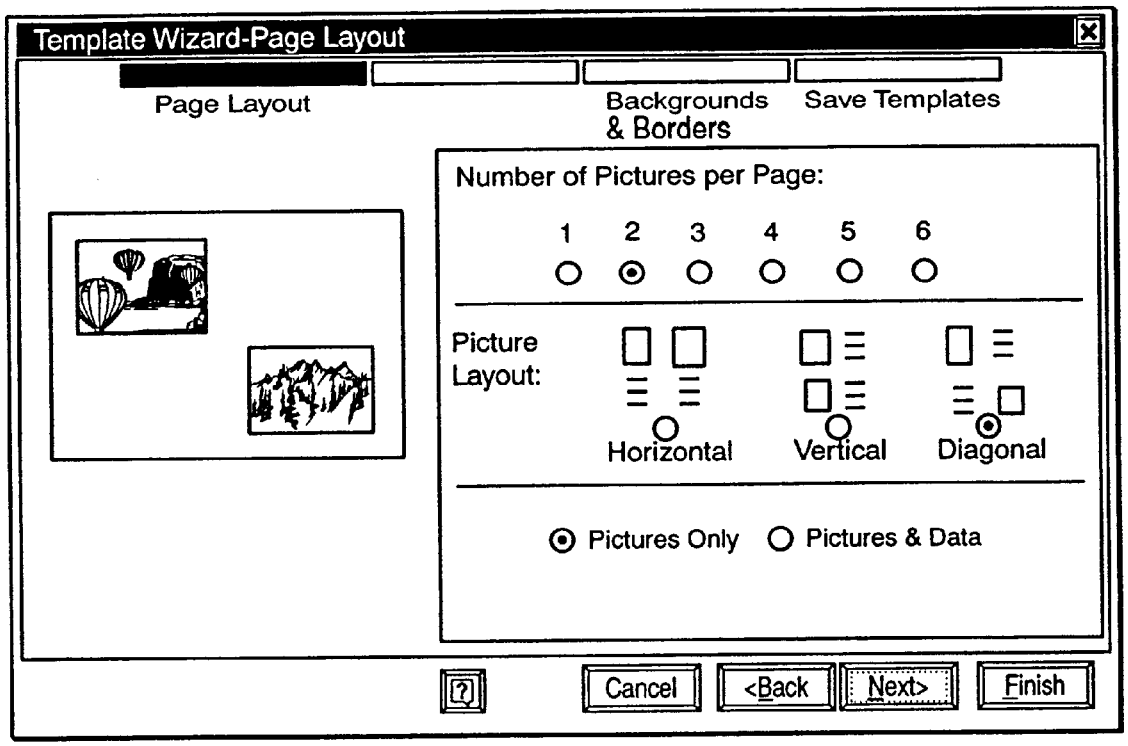
FIG. 14 is a view showing a user interface for the "Pictures Only" dialog.

If "Pictures Only" is selected, then the dialog changes to the screen shown in FIG. 14. On this screen, the preview no longer shows simulated lines of text and the next step shown in the guide across the top is the Background and Borders dialog, which is where the user goes when "Next" is pushed, bypassing the data layout dialog.

[3.1.14.1.2 "Printing Template Wizard—Data Layout"]

Figure 15:
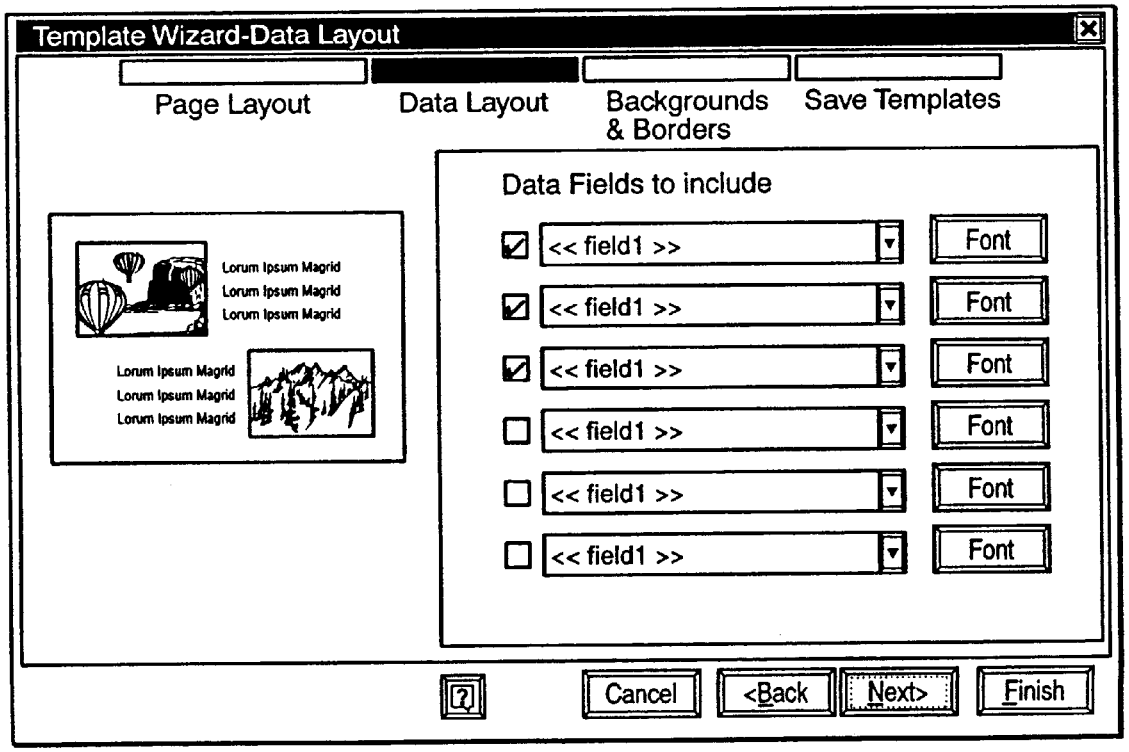
FIG. 15 is a view showing a user interface for the "Pictures and Data" dialog.

If the user does select "Pictures and Data", the next dialog is the data layout dialog shown in FIG. 15. In this dialog the user can select up to size fields of data from the MOMA database to be displayed with each picture.

Selection boxes allow the user to turn on up to size fields. If the user skips a field entry then the next one selected is used (i.e., if the user selects the first, second and fourth entry, only three fields are printed next to each picture).

The available MOMA fields are displayed in a drop down list on each entry line. Users can select that same field more than once.

The font button allows users to pick a typeface, style (bold, italic, underline), Relative Size (large, medium, small, tiny), and Color (16 color palette). Relative font sizes are used and the specific font size will be determined automatically based on other selections (# pictures/page, layout, etc.). Relative font sizes also control the number of characters per line and number of lines that will be displayed for each field.

To summarize, a method for printing components of a multimedia object having at least an image component and a text component, each corresponding to a field in a database record that stores the multimedia object includes displaying a user interface which includes a thumbnail view of the image component of the multimedia object and user selectable fields corresponding to fields in the multimedia database, accepting user selection of up to plural fields for printout with the image component, selecting an output template for the image component and the user-selected field, and outputting the image component together with the user-selected fields in the template selected by the user.

[3.1.14.1.3 "Printing Template Wizard—Backgrounds & Borders"]

Figure 16:
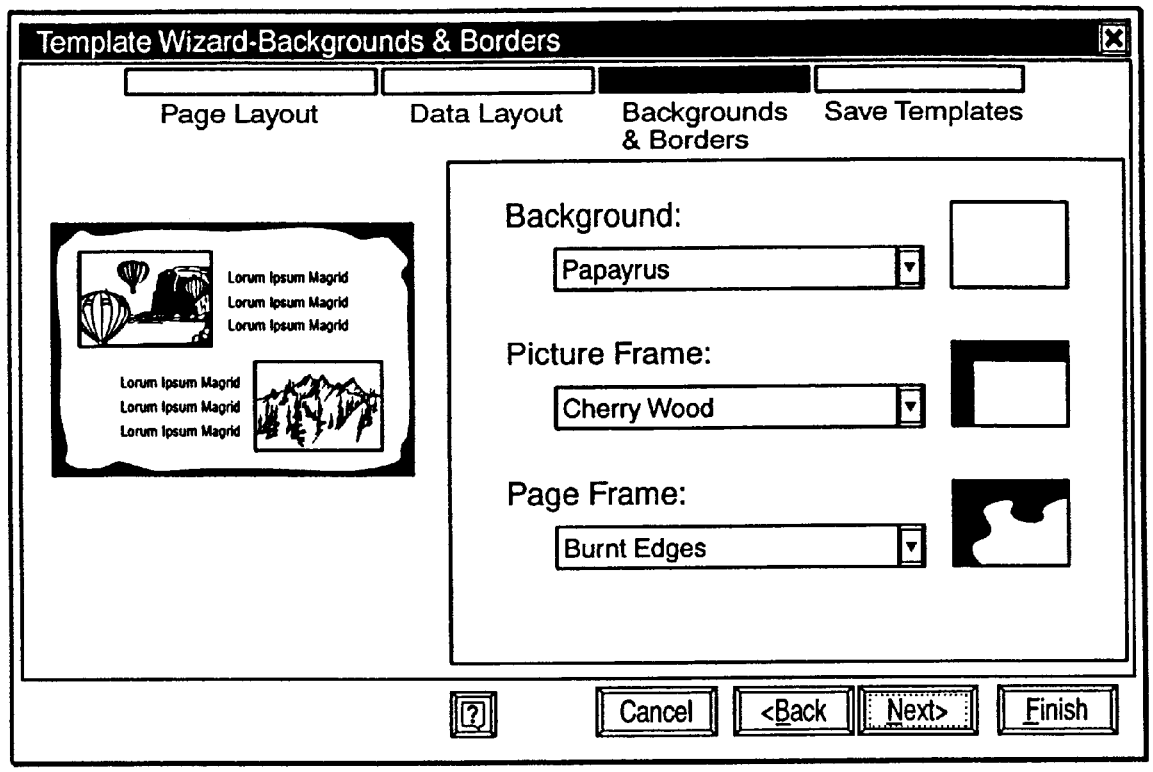
FIG. 16 is a view showing a user interface which allows the user to pick graphical enhancements.

The next dialog shown in FIG. 16 allows the user to pick some limited graphical enhancements to produce a pleasing, colorful album.

A series of backgrounds, both solid colored and tiled patterns are provided. When the user select one from the drop down list, close up view of the background is shown to the right and indicated on the page preview. The background fills the area between the outside of the picture frames and the inside page frame. The selected picture frame will place a graphical boarder around the outside of the images. The selections will include traditional wood frames, photo album corner tabs, and drop shadows. The Page frames print out to the printable area edge of the selected printer.

The architecture of the graphical enhancement selectors is such that users can add additional selections through program upgrades. These upgrades may be made available on a web site to encourage users to visit the site. For example, in exchange for registering the product on line a certain number of enhancements will be provided.

[3.1.14.1.4 "Printing Template Wizard—Save Template"]

Figure 17:
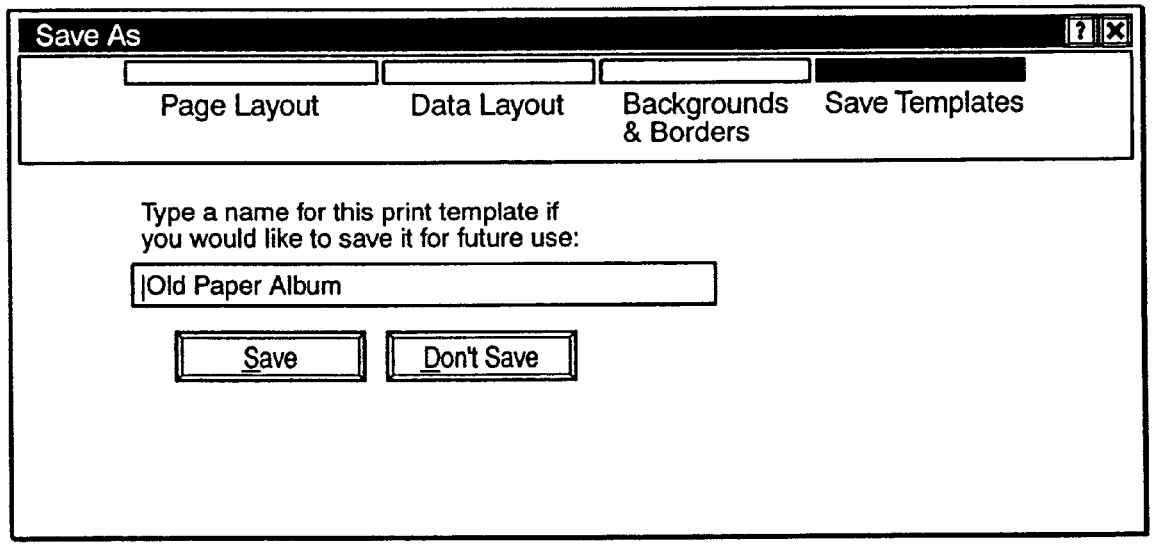
FIG. 17 is a view showing a user interface for the save template feature.

Once all the selections have been made, the user is given the opportunity to save the template settings as shown in FIG. 17.

If the user is modifying an existing template, the name of the existing template is shown allowing the user to re-save the template with the new settings, or continue without updating the existing template.

If the user is creating a new template, the name field is empty. Once the user types text into the name field, the save button is activated.

[3.1.14.1.5 "Printing Template Wizard—Print With New Template"]

Figure 18:
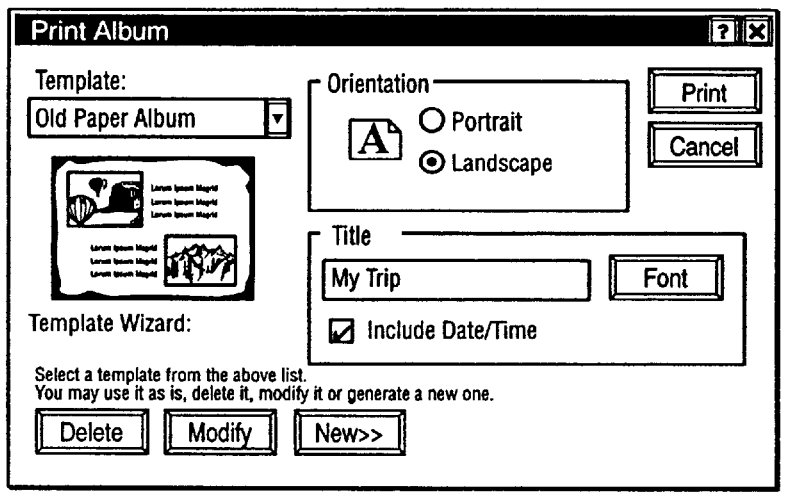
FIG. 18 is a view showing a user interface for a preview reflecting the new settings.

When the new or modified settings are completed (whether saved or not), the user is returned to the initial Print Album dialog with the preview reflecting the new settings as shown in FIG. 18. If the template was saved, that name is indicated in the list. If the template is not saved, no template name is indicated.

[3.1.14.2 "Save as HTML"]

Figure 19:
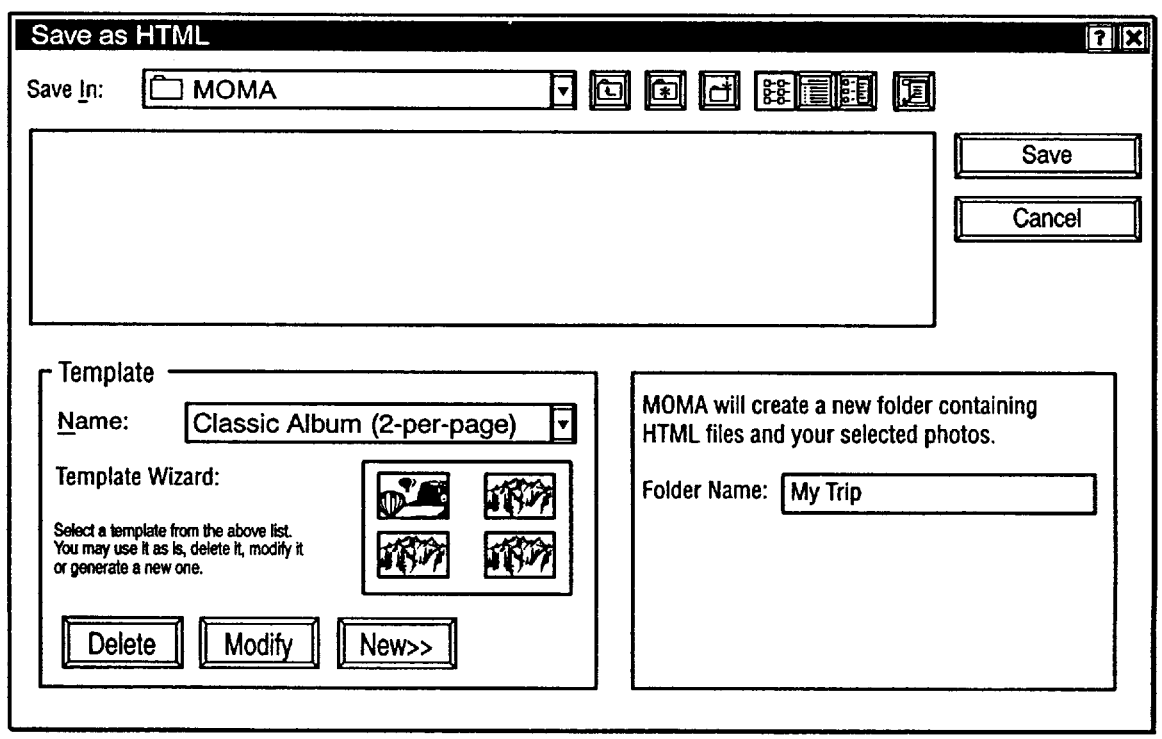
FIG. 19 is a view showing a user interface for the "Save as HTML" dialog.

When the user selects to "Save as HTML", the dialog shown in FIG. 19 appears. The user can select a pre-defined template or create a new one using the template wizard. A preview of the selected template is shown. Photos in the template are samples only. Templates are stored internally in the MOMA database. The user can delete or modify the selected template or select "New" to create a new template setting. If delete is selected an "Are you sure?" dialog is displayed. If the user select "Modify" the dialog proceeds to the template wizard sequence described below with the existing template settings displayed as a starting point. The existing template may be modified accordingly and re-saved with the new settings if the user so desires. If "New" is selected, the dialog proceeds through the wizards using the defaults settings as a starting point and a new template can be saved if the user so desires.

The action of saving as HTML will create a new folder contained in the selected location. Both the folder name and the HTML page "title" will be the same. The folder will contain both the generated HTML pages and the linked image files (JPEG format). The user can then ftp the files to their web site. All references to image files in the HTML file will assume the images are located in the same directory as the HTML file. The first HTML file will be named index.htm, subsequent files will be called from the first and will be named based on the folder name, i.e., if the folder is named My Trip, the subsequent files will be named My_Trip2.htm; My_Trip3.htm.

If the user wants to proceed with the selected template, he/she presses "Save" and the HTML files will be generated and saved in the new folder.

The basic installation will include a set of five to eight pre-defined templates including:

Plain Photo Album (4 per page)—default

Classic Photo Album (4 per page with boarders and background)

Kids Photo Album (8 pre page "Sticker Book" style)

Flyer (1 per page with first 6 data fields as default)

Catalog (2 per page, diagonal with 1" three data fields as default)

Others to be determined

A template wizard, described below, allows a user to customize and/or modify templates as desired.

[3.1.14.2.1 "HTML Template Wizard—Page Layout"]

Figure 20:
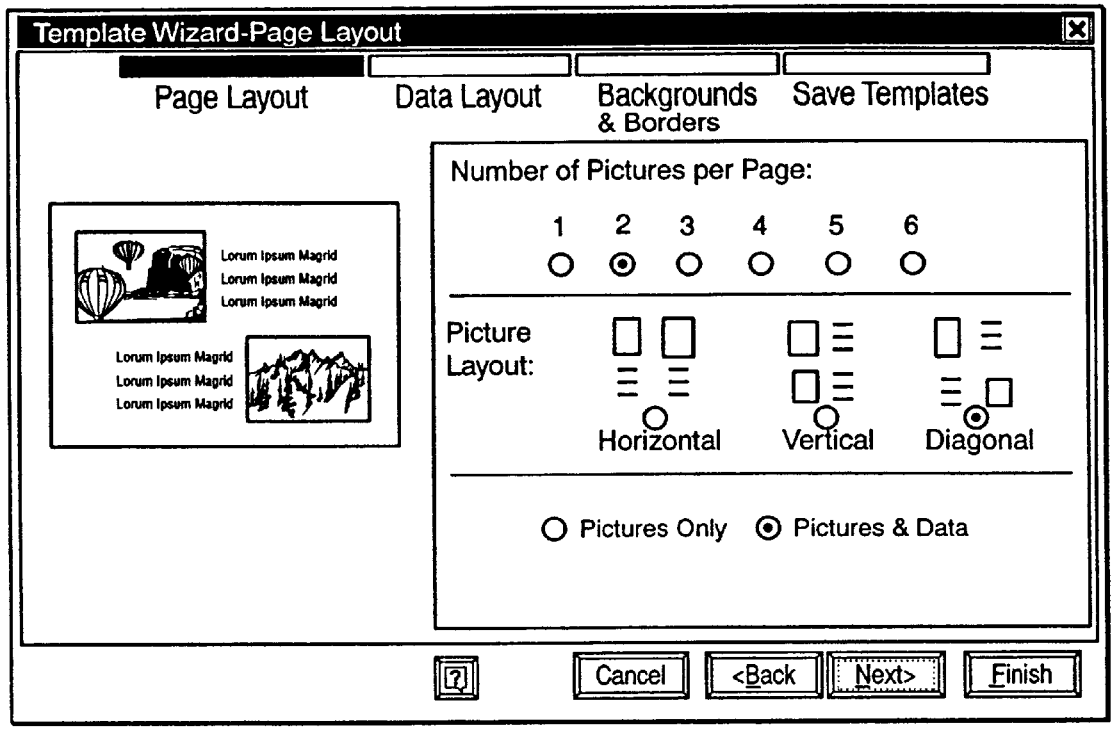
FIG. 20 is view whowing a user interface which allows the user to generate a new template or modify an existing template.

If the user selects to generate a new template or modify an existing template, the dialog shown in FIG. 20 starts the HTML template wizard process. A guide across the top lists the steps in the wizard sequence and show the user where they are in the process. This dialog allows the user to select the layout of the pictures on the page. As modifications are made to the settings, appropriate changes are made to the preview sample page.

The user scan select how many pictures to display on the page. The selection can either be implemented as a series of radio buttons or a drop down. If the user has selected less than six pictures for the HTML album, the non-applicable selections will be grayed out.

For the Picture layout, the dialog will show sketches of two pictures and three lines displayed side by side (horizontal), up and down (vertical), or diagonally. These sketches will not changed base on the number of pictures per page. The preview will indicate the actual layout of how the HTML file would look on a browser, as summarized in Table 4.

TABLE 4

HTML Layout

| Number of Pictures | Horizontal | Vertical | Diagonal |
|---|---|---|---|
| 1 | Image on top, text below | Image on left, text on right | Image in upper left corner, text in lower right corner |
| 2 | Two images across top, text below each | Two images down left of page, text to right of each | One image in upper left corner, associated text to right of it; next image in lower right, associated text to left of it |
| 3 | Three images across top, text below each | Three images down left of page, text to right of each | One image in upper left corner, associated text to right of it; next image in middle right, associated text to left of it; last image in lower left, associated text to right of it |
| 4 | Two images across top, text below each, next two across middle, text below each | Four images down left of page, text to right of each | One image in upper left hand corner, associated text to right, alternate down the page |
| 5 | Two images across top, text below each, next three across middle, text below each | Five images down left of page, text to right of each | One image in upper left hand corner, associated text to right, alternate down the page |
| 6 | Three images across top, text below each, next three across middle, text below each | Six images down left of page, text to right of each | One image in upper left hand corner, associated text to right, alternate down the page |

Figure 21:
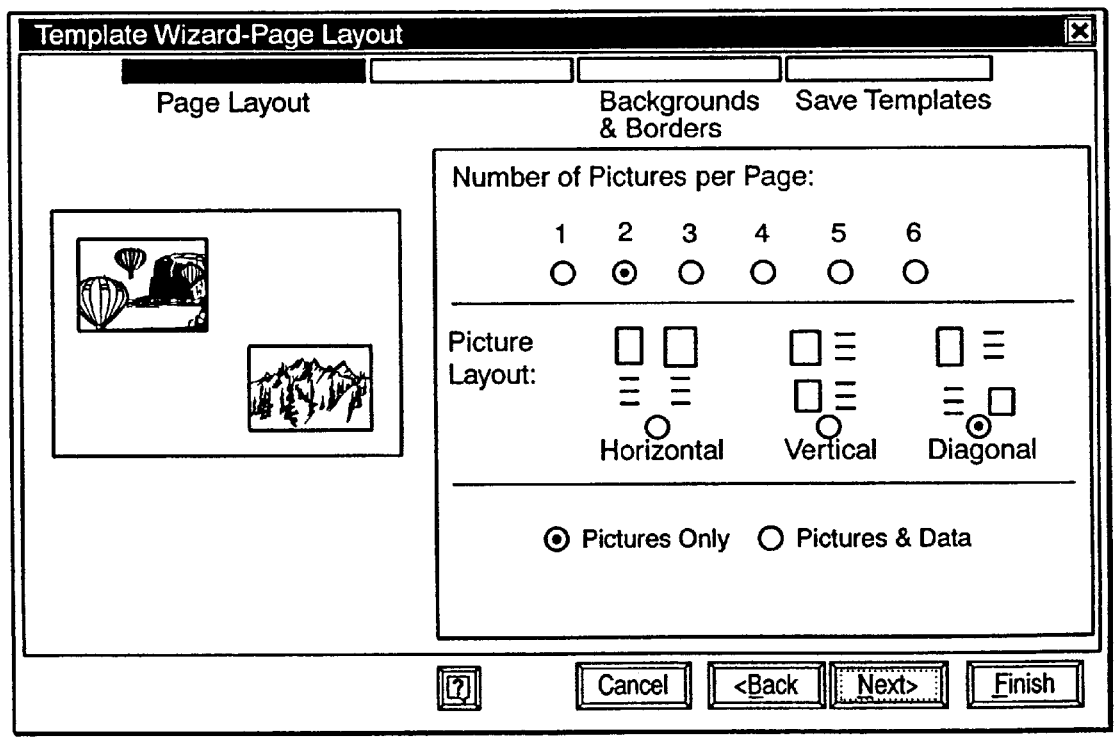
FIG. 21 is a view showing a user interface for the "Pictures Only" dialog.

The last selection enables the user to decide if data fields from the MOMA database are displayed with each picture. If the user selects "Pictures and Data", the dialog in FIG. 20 above is shown and the next step in the process is the data layout dialog. If "Pictures Only" is selected, then the dialog changes to the screen shown in FIG. 21. On this screen, the preview no longer shows simulated lines of text and the next step shown in the guide across the top is the Background and Boarders dialog, which is where the user goes when "Next" is pushed, bypassing the data layout dialog.

[3.1.14.2.2 "HTML Template Wizard—Data Layout"]

Figure 22:
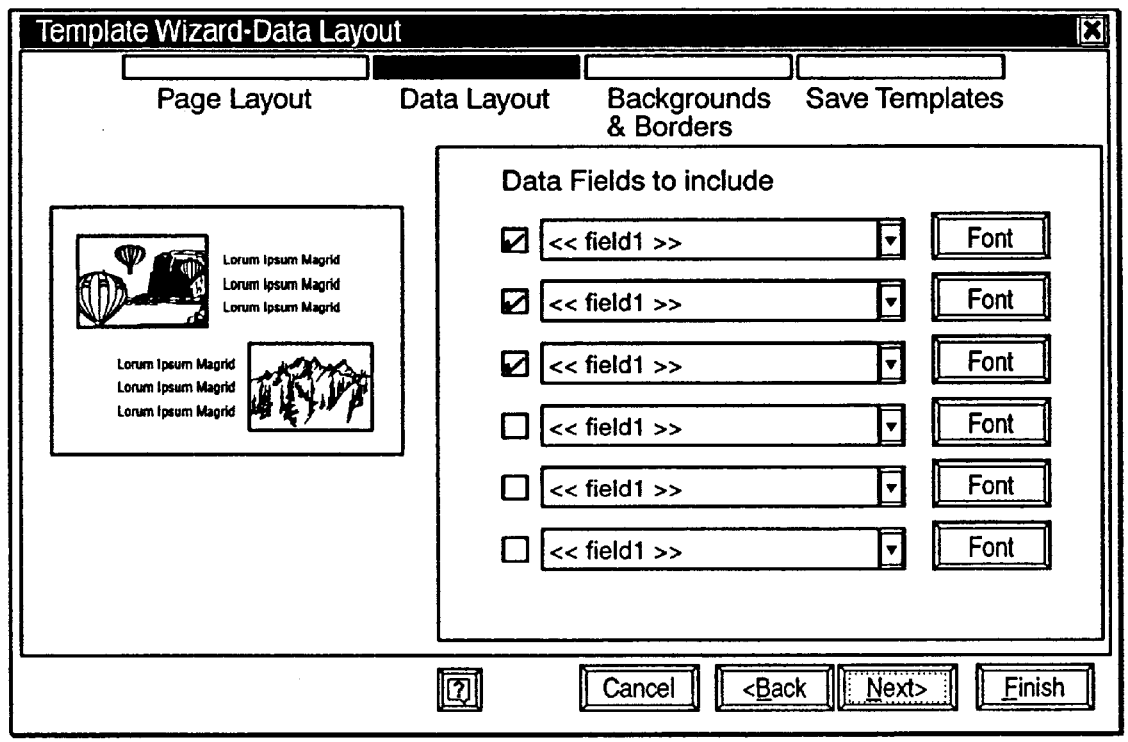
FIG. 22 is a view showing a user interface for the "Pictures and Data" dialog.

If the user does select "Pictures and Data", the next dialog is the data layout dialog shown in FIG. 22. In this dialog, the user can select up to six fields of data from the MOMA database to be displayed with each picture.

Selection boxes allow the user to turn on up to six fields. If the user skips a field entry then the next one selected is used (i.e., if the user selects the first, second and fourth entry, only three field are printed next to each picture).

The available MOMA fields are displayed in a drop down list on each entry line. Users can select that same field more than once.

The font button allows users to pick a typeface (Proportional/Fixed), style (Bold, Italic, Underline), relative size (Large, Medium, Small, Tiny), and color (16 color palette). Relative fonts sizes are used and the specific font size will be determined automatically based on other selections (# pictures/page, layout, etc.). Relative font sizes also control the number of characters per line and number of lines that will be displayed for each field.

To summarize, a method for printing components of a multimedia object having at least an image component and a text component, each corresponding to a field in a database record that stores the multimedia object includes displaying a user interface which includes a thumbnail view of the image component of the multimedia object and user selectable fields corresponding to fields in the multimedia database, accepting user selection of up to plural fields for printout with the image component, selecting an output template for the image component and the user-selected field, and outputting the image component together with the user-selected fields in the template selected by the user.

[3.1.14.2.3 "HTML Template Wizard—Backgrounds & Buttons"]

Figure 23:
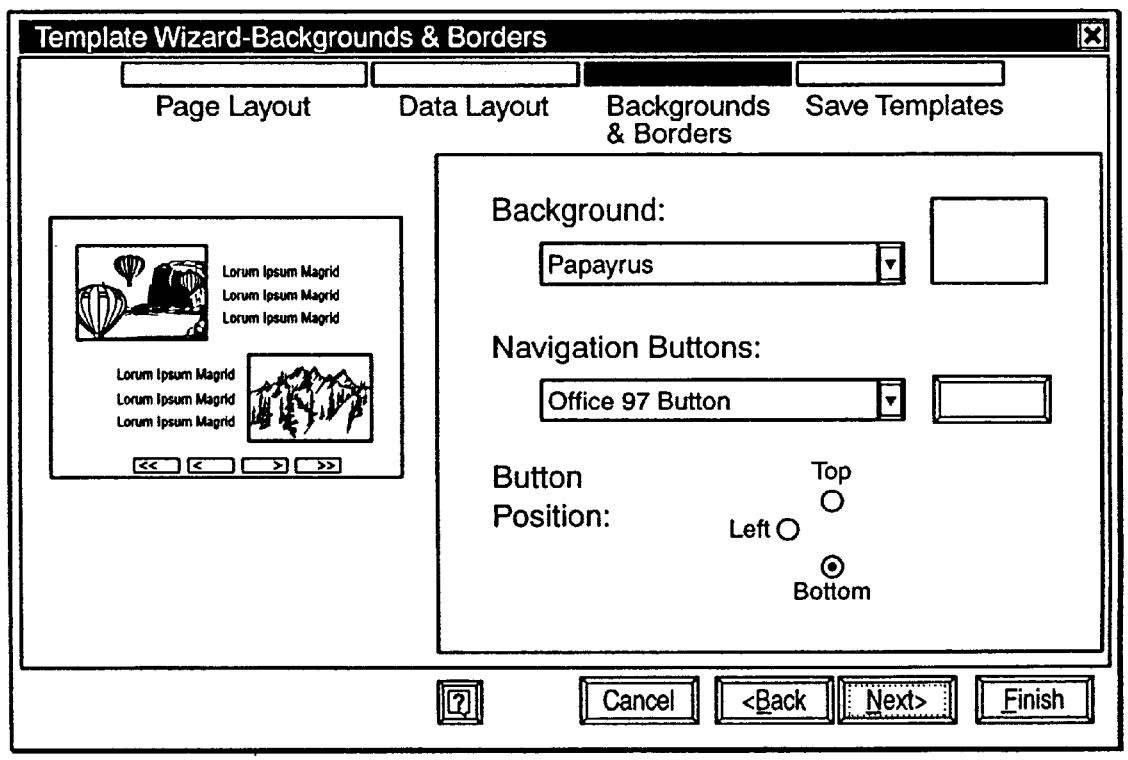
FIG. 23 is a view showing a user interface which allows the user to pick graphical enhancements.

The next dialog shown in FIG. 23 allows the user to pick some limited graphical enhancements to produce a pleasing, colorful web page.

A series of backgrounds, both solid colored and tiled patterns will be provided. The patterns will be designed with a "browser-safe palette" to avoid dithering. When the user selects one from the drop down list, a close up view of the background is shown to the right and indicated on the page preview. The navigation buttons will enable the viewer of the web page to move through the web album as follows: "<<" go to first page, "<" back one page, ">" forward one page, ">>" to end of album. Buttons will be able to be placed on the top, left side, or bottom of the page. An option to place buttons on the right of the page will not be provided since that can produce unplanned results in different browsers.

The architecture of the graphical enhancement selections will be such that users can add additional selections through program upgrades. These upgrades may be made available on an internet web site to encourage users to visit the site. For example, in exchange for registering the product on line a certain number of enhancements might be provided.

[3.1.14.2.4 "HTML Template Wizard—Save Template"]

Figure 24:
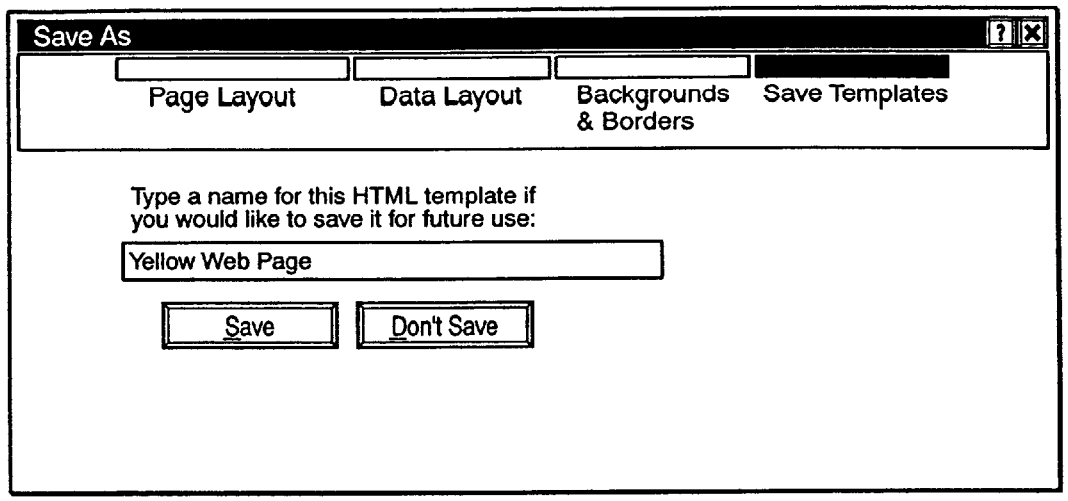
FIG. 24 is a view showing a user interface for the Save Template of the HTML Template Wizard.

Once all the selections have been made, the user is given the opportunity to save the template settings as shown in FIG. 24.

If the user is modifying an existing template, the name of the existing template is shown allowing the user to re-save the template with the new settings, or continue without updating the existing template.

If the user is creating a new template, the name field is empty. Once the user types text into the name field, the save button is activated.

[3.1.14.2.5 "HTML Template Wizard—Save HTML with New Template"]

Figure 25:
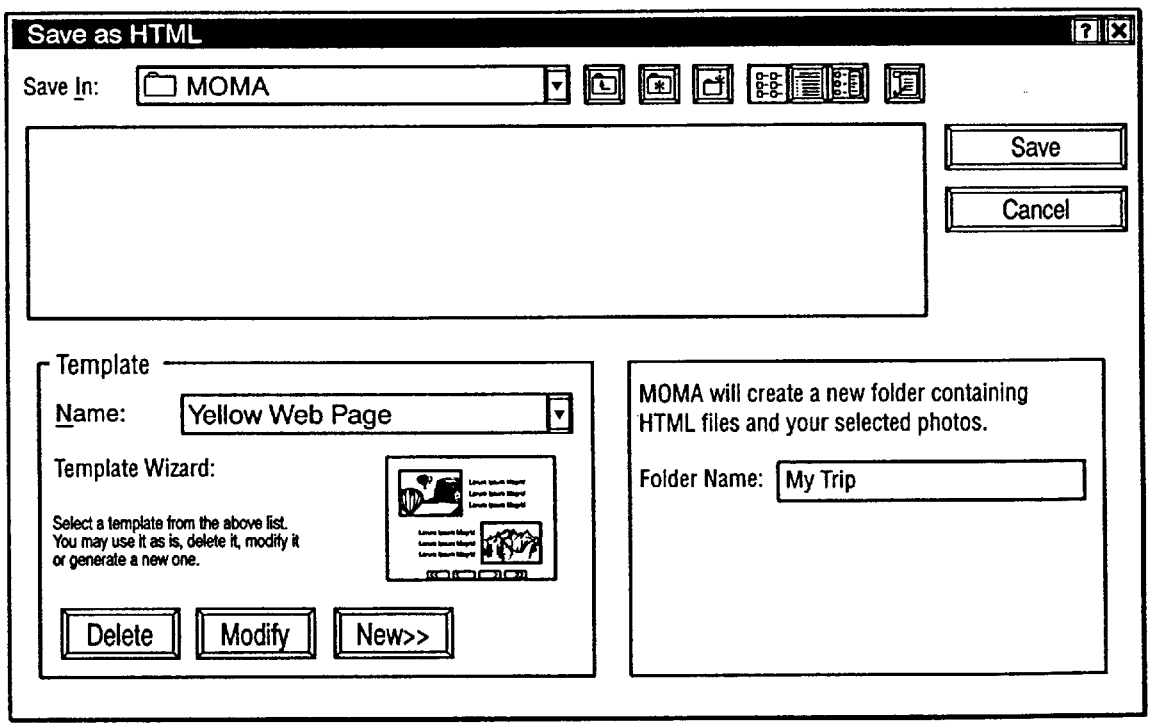
FIG. 25 is a view showing a user interface for a preview reflecting the new settings to be saved.

With the new or modified settings being completed (whether saved or not) the user is returned to the initial Save as HTML dialog with the preview reflecting the new settings as shown in FIG. 25. If the template was saved, that name is indicated in the list. If the template is not saved, no template name is indicated.

[3.2 "Edit Menu"]

The edit menu consists of the following menu items: Undo; Cut; Copy; and Paste.

[3.2.1 "Undo"]

The Undo menu will be dynamically changed according to previous action. Currently, the undo functions include:

1. Undo delete album. This undo function is enabled only after the user has deleted an album.

2. Undo delete image. This undo function is enabled only after the user has deleted an image from the current active album.

[3.2.2 "Cut"]

This function is enabled when the image editing and enhancement functions are implemented.

[3.2.3 "Copy"]

The user can copy any of the selected images of the current active album and paste it to any other application.

[3.2.4 "Paste"]

The user can paste an image to MOMA image album by first copying the image from any other application.

[3.3 "View Menu"]

The view menu consists of the following menu items: Toolbar; Status Bar; Notebook; Spreadsheet; Thumbnail and Option

[3.3.1 "Toolbar"]

When the check mark is displayed, the horizontal toolbar will be visible to the user. When the check mark is not displayed, the horizontal status bar will be invisible to the user.

[3.3.2 "Notebook"]

Figure 26:
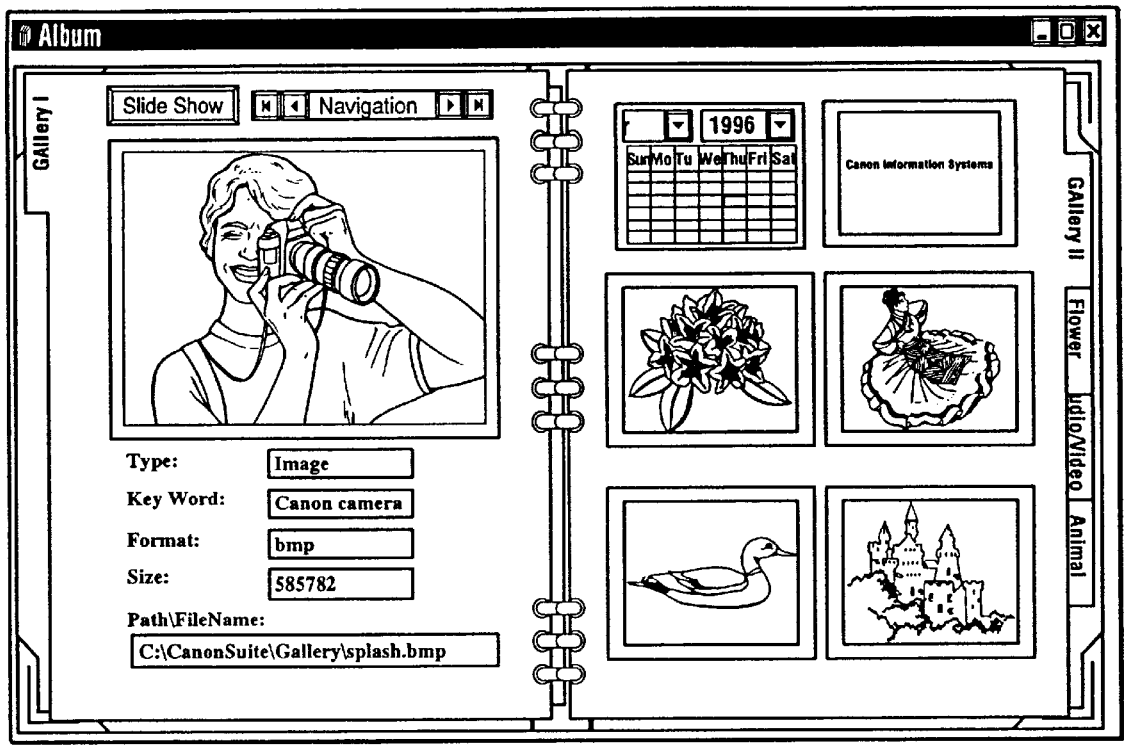
FIG. 26 is a view showing a user interface for the Notebook view.

The notebook view is shown in FIG. 26. The notebook view uses the album metaphor to organize/manage image/media files for the MOMA. Just as the user can add photos to the user's personal album, the user can add or insert any number of images to the user's album. The notebook view will be designed to manage images and information by using the tab keys and page keys. The tab keys provide an intuitive method for the user to organize and categorize media files. The tab keys are dynamically created based on the associated database tables for the number. The user can use the tab key to navigate between general category such as flowers, animals, vacation photos, etc. Within each category, the user can use the earmark of the page key to flip through all of the pages contained in that category.

[3.3.3 "Spreadsheet"]

Figure 27:
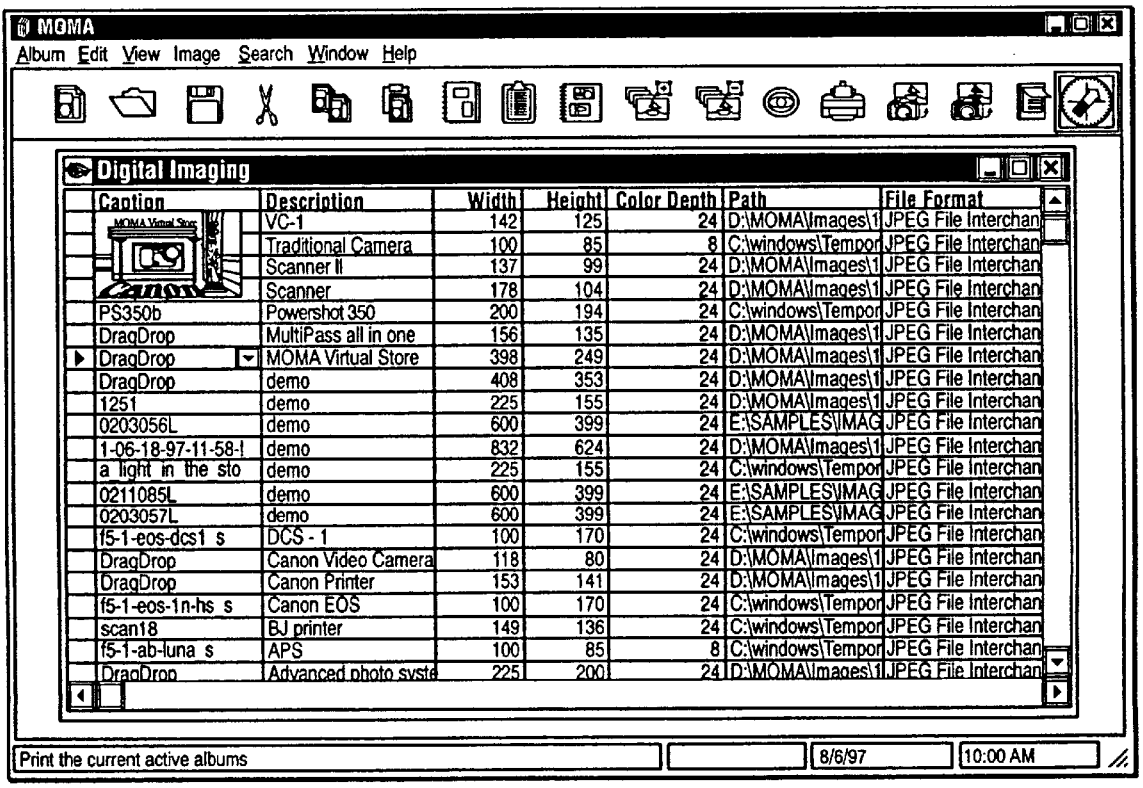
FIG. 27 is a view showing a user interface for the Spreadsheet view.

The spreadsheet view is shown in FIG. 27. Media files can also be viewed in the form of a database table. Each column of the table represents one of the properties of the associated media file. Each row of the table represents one record that stores all properties such as index, file type, format, size, date, time, file path and name, are automatically generated when the album is created, some of the properties such as description (comments) and keyword should be specified by the album creator. Some of the spreadsheet cells can be updated or edited like any standard spreadsheet editing. Viewing media files in database tables is more efficient in terms of speed and memory consumption.

There are both vertical and horizontal scroll bars. Vertical bar will be enabled whenever there is not enough space for displaying more records. Horizontal bar will be enabled whenever there is not enough space displaying more columns. The users can scroll up and down or left to right to view more records or fields.

In the spreadsheet view, there are two kinds of data fields: basic common fields and customized fields for each collection of albums. All of the albums have the same basic common field name. The basic common fields are: ImageID, VolumeID, Driver Letter, Volume Label, Label, Name, Description, Keyword, File Path, File Name, File Format, Date/Time Created, Date/Time Modified, Image Width, Image Height, Image Color Depth, and other camera related information.

When the user highlights or selects a particular record, the corresponding thumbnail image will show up on the upper left corner of the spreadsheet, as illustrated.

To summarize, a user interface for displaying a database of multimedia objects including at least an image component and a non-image component with each component corresponding to a field in a database record for the multimedia component includes a display of at least a portion of a table having entries for multimedia objects in the database extending in a first direction and individual fields within each database record extending in a second direction perpendicular to the first direction, a cursor display of a mouse cursor superimposed over one of the tabular entries in the table display, and a pop-up display of a thumbnail of an image component of a multimedia object which pops-up when the mouse cursor is superimposed over the corresponding image component of the multimedia object.

The spreadsheet can be sorted by single clicking any of the columns. In addition, the user can change the column width by dragging the boundary on the right side of the column heading until the column is the width you want. The user can change the height of the row or record by dragging the boundary below the row heading until the row is the height you want.

Figure 28:
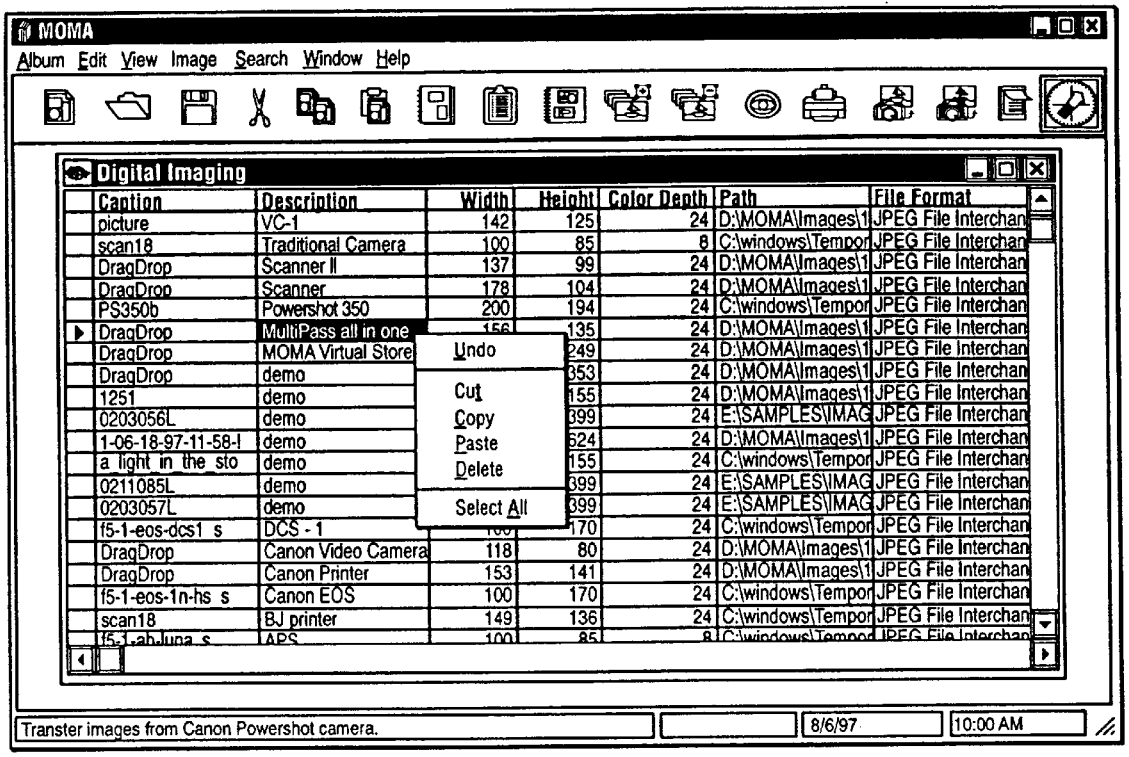
FIG. 28 is a view showing a user interface for the pop-up edit menu for performing editing functions.

The user can perform in cell editing for some of the editable columns such as description. As shown in FIG. 28, by clicking the right mouse button, the user can pop up the edit menu for performing editing function such as undo, copy, delete, paste, and select all. The user can directly work in the cell to type in the cell with up to maximum 256 characters. In order to update all of the updated data in the database, the user has to move the mouse cursor to next record. Otherwise, the previous edited data won't get saved in the database.

Figure 29:
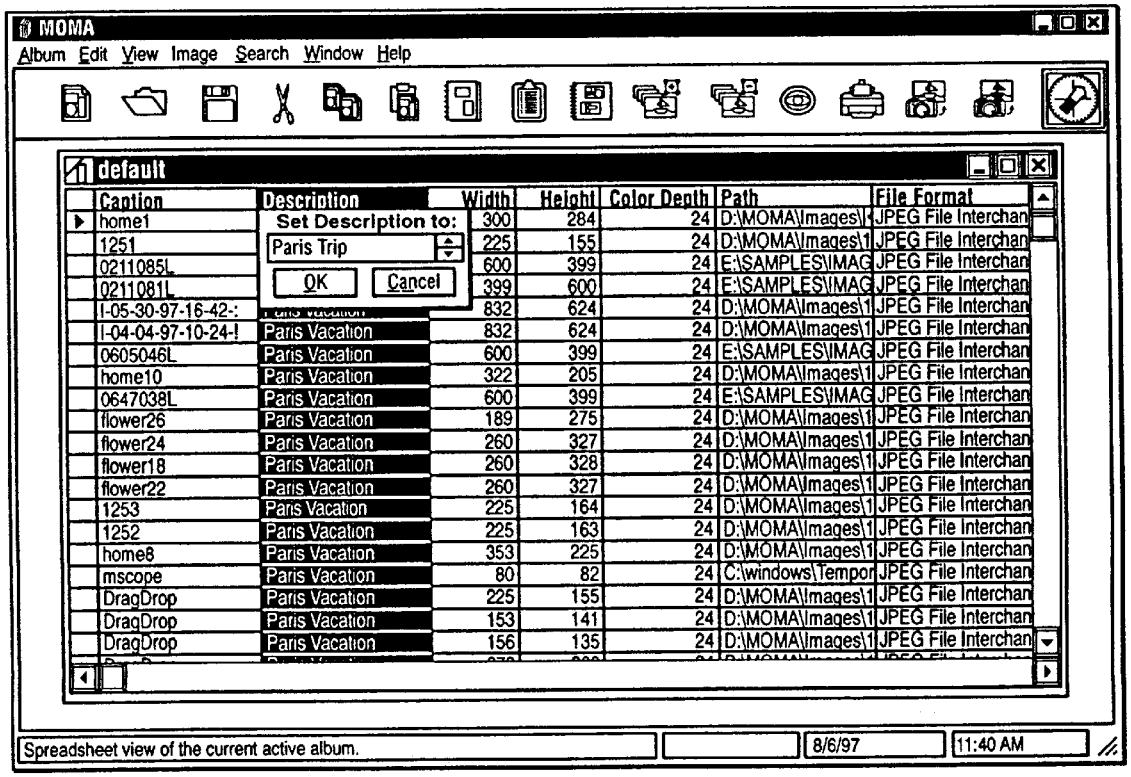
FIG. 29 is a view showing a user interface for the global text annotation.

The global text annotation is designed to allow the user to change all of the text in the description filed. For example, the user may not want to type in detail description for each of the photos he/she took during the Paris vacation trip. Instead, as shown in FIG. 29, the user globally annotated the created photo album by Paris Trip. The user can also select one or several records for text annotation.

Figure 30:
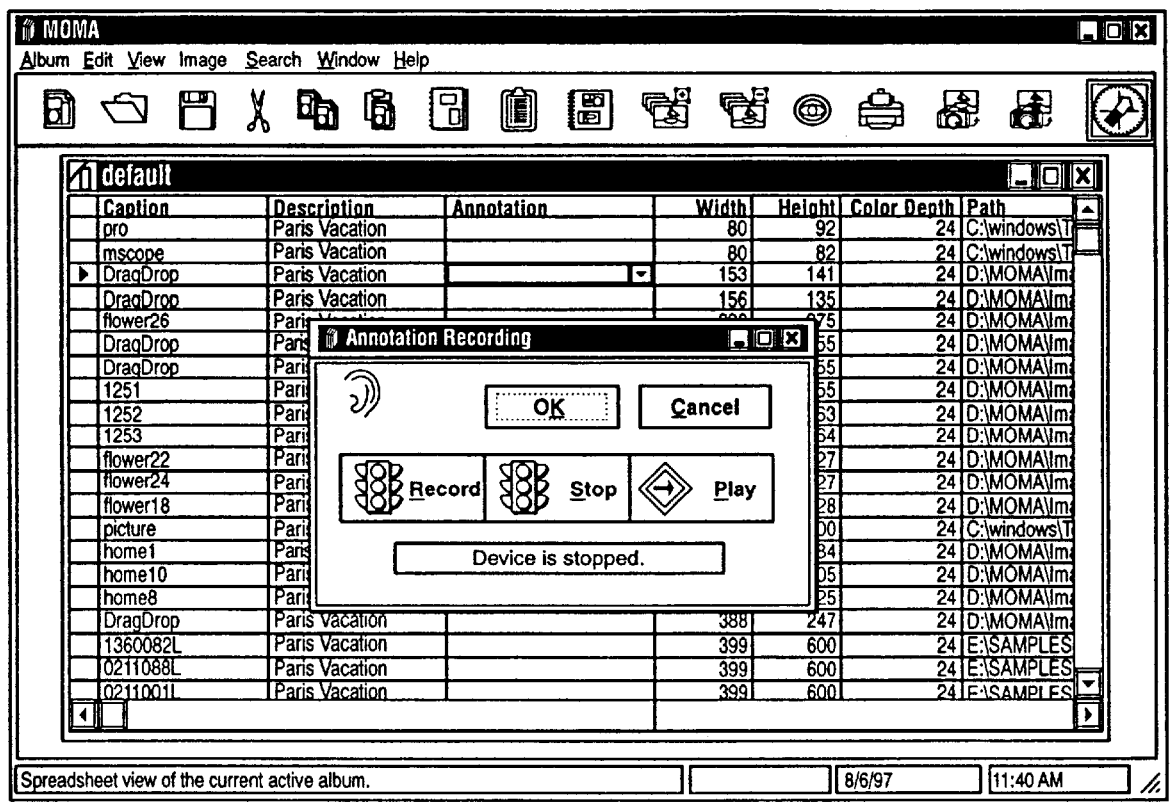
FIG. 30 is a view showing a user interface for recording audio annotations for a selected image.

The user can select any of the image files and record one audio annotation file for the selected image, as shown in FIG. 30. The file format of the audio annotation file is "WAV", a standard windows audio file format. All of the audio annotation files are stored in the "Annotations" sub-directory.

Figure 31:
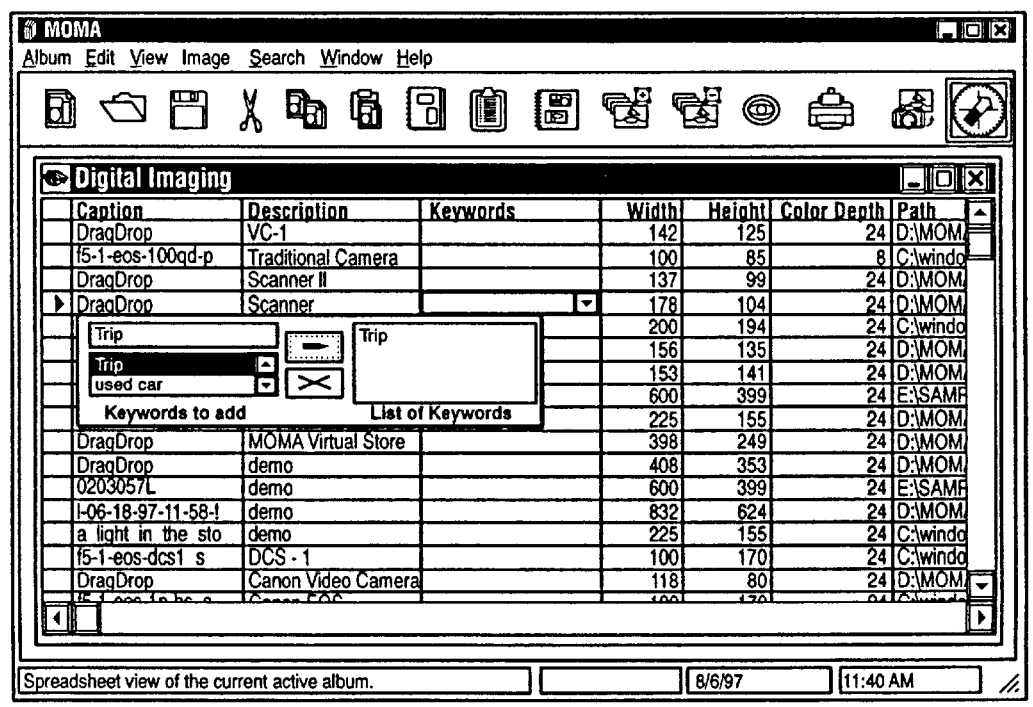
FIG. 31 is a view showing a user interface for adding one or more keywords to a selected image.

FIG. 31 shows how the user can add one or more keywords to the selected image by either selecting a keyword from a list of the existing keywords or by typing in a new keyword.

[3.3.4 "Thumbnail"]

Thumbnail view of album is the basic view method used by traditional album management programs. The default MOMA album view is the thumbnail view. By choosing items from the View menu, the user can view each album in terms of three different views, Thumbnail view, Spreadsheet view, and Notebook view, as described herein.

Figure 32:
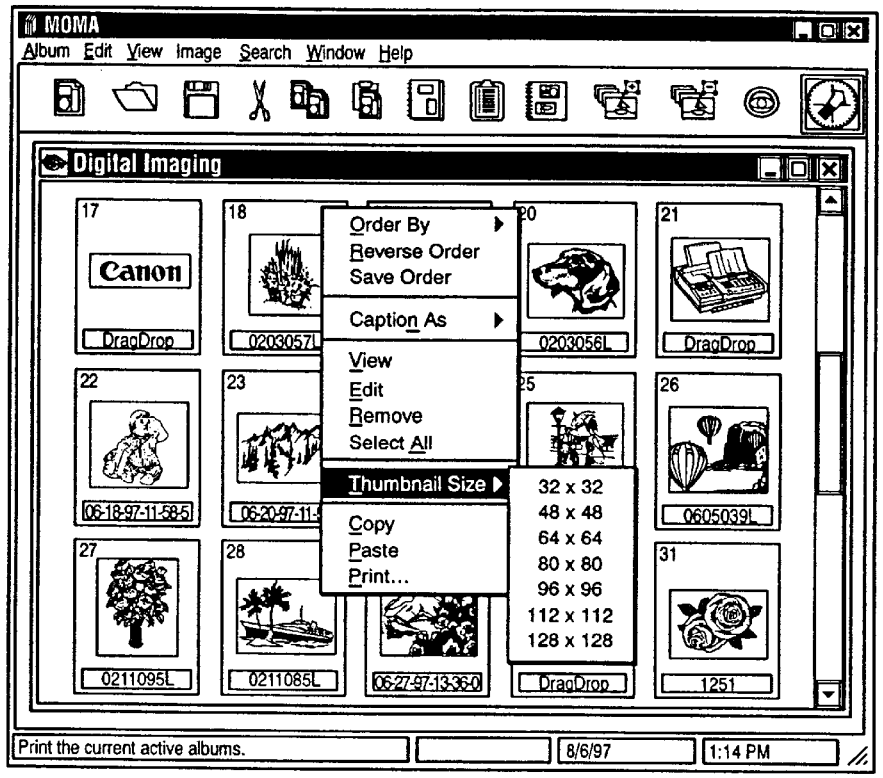
FIG. 32 illustrates a user interface for a thumbnail view window.

The user can click the right mouse button to pop up the menu items that are applicable to the thumbnail view windows, as shown in FIG. 32. All of the thumbnails can be ordered by using any of the basic field name or the customized field names. The default caption for thumbnails is the caption field. However, the user can use any of the basic field name or the customized field name as the caption.

The user can view all of the selected images by selecting the "view" menu item from the pop-up menu. Once the user clicks the view menu, a viewer application will be launched to view all of the selected images with desired special effects. The user can either view the selected image inside the view window or in the full screen.

The viewer application will run in two modes: AUTOMATIC and MANUAL. In AUTOMATIC (the default mode), the viewer mode will automatically start showing the images one by one at certain time intervals with some smooth transition between the two images. The image will last on the screen for some predefined and user configurable time period. User can stop at a certain image by pressing STOP button and then can start the slide show using AUTOPLAY button. If there are any sounds for a particular image, the image will stay on until all the sound files associated with that image file are played.

In MANUAL mode, user will have to use BACK and FORTH buttons to progress through the selected images. It will also have a SOUND button for the sound annotations in the album. The user can listen to sound data associated with a particular image by pressing SOUND button on the toolbar. The SOUND button will be enabled if there are any sound files available for the current image being displayed.

Other user configurable options are related to showing of the images. Images will not be uniform in size and re-size options are therefore preferable.

[3.3.5 "Options"]

The options dialog box will allow user to set the time interval between two images (applicable to AUTOMATIC mode).

[3.4 "Image Menu"]

The Image menu contains "Add", "Delete" and "Information" selections.

[3.4.1 "Add"]

Figure 33:
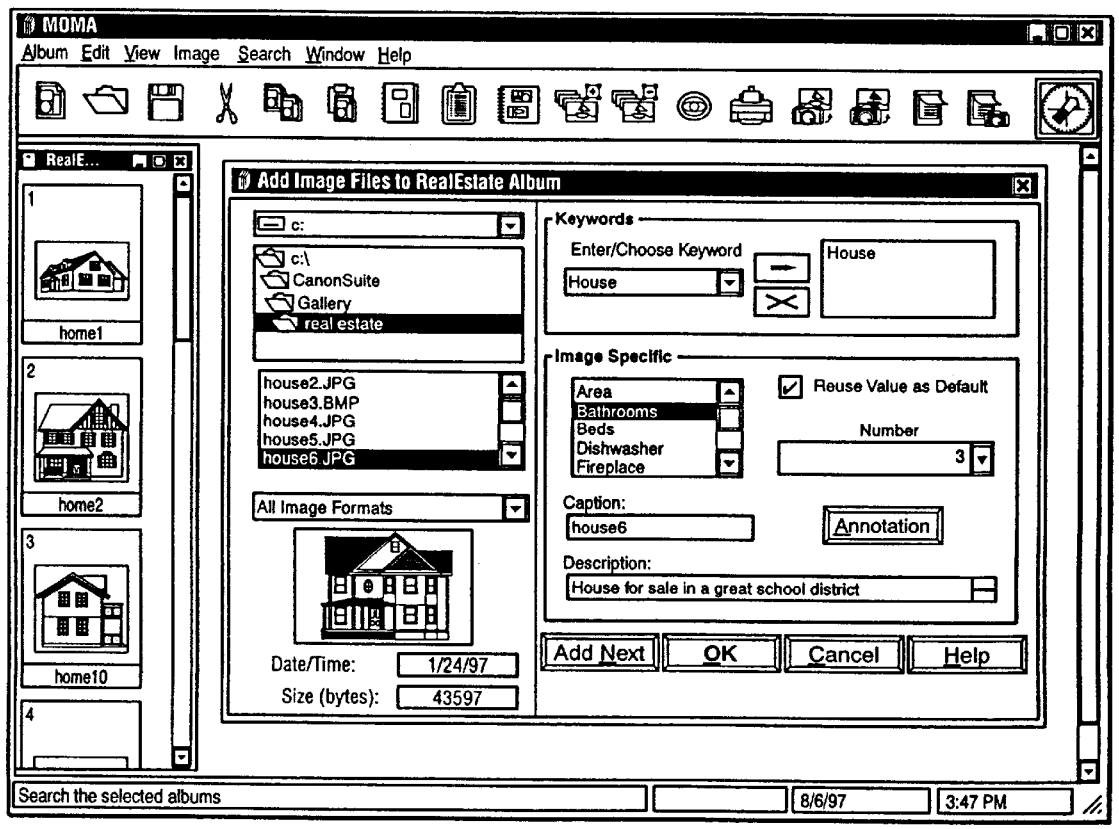
FIG. 33 illustrates a user interface for an "Add" dialog box.

The "Add" dialog box shown in FIG. 33 allows the user to add media file to the current active album. If there is no active album, images will be added to the default album. The user needs to select the drive, directory, image files that will be added to the current active album. The user can add one image at a time, or select several images by using the "CTRL" or "Shift" key to do multiple selections. Once the image is selected, a thumbnail will be displayed to preview the selected image. On the right side of the dialog box, the user can type in a keyword or select a keyword from the drop down list box. Click the arrow button to add a keyword and click the X button to delete the highlighted keyword.

Below the keyword frame, the image specific frame provides the space for user to enter information for all of the customized field names for the current active album. The user needs to select each of the field names one at a time, and enter information for the selected field. If the user neglects or forgets to select and enter information for any of the fields, the corresponding database field will be empty.

To help the user work more efficiently, MOMA supports both OLE drag and drop and file drag and drop. The OLE/file drag and drop always applies to the current active album. If there is no current active album, the dragged files will be dropped to the default album. The user can use the "drag and drop" technique to perform the following operations:

1. Drag one or several files from Windows Explorer view and drop them to a MOMA album.

2. Drag one or several files from desktop and drop them to a MOMA album.

3. Drag one image from an album to an OLE compliant image editing software such as Photoshop, Microsoft Image Composer, Ulead PhotoImpact, etc.

4. Drag one full image or selected region of interest from any OLE compliant image application software to MOMA album.

5. Drag one image from any OLE compliant Internet Browser and drop it to a MOMA album.

[3.4.2 "Delete"]

The user can delete any selected member of the current active album by either clicking the delete menu or the delete button. CTRL+X will be the key combination for performing deleting.

[3.4.3 "Image Info"]

The menu item for user to view information such as file size, file name, file format, color depth, etc.

[3.5 "Search Menu"]

In order to search the MOMA database, the user needs to select collections and albums. Once the user selects a specific collection and albums, all of the associated keywords will be displayed in the keyword drop down list box. The user can select any of the listed keywords. The user can also use any of the customized fields to search the MOMA database system.

Figure 34:
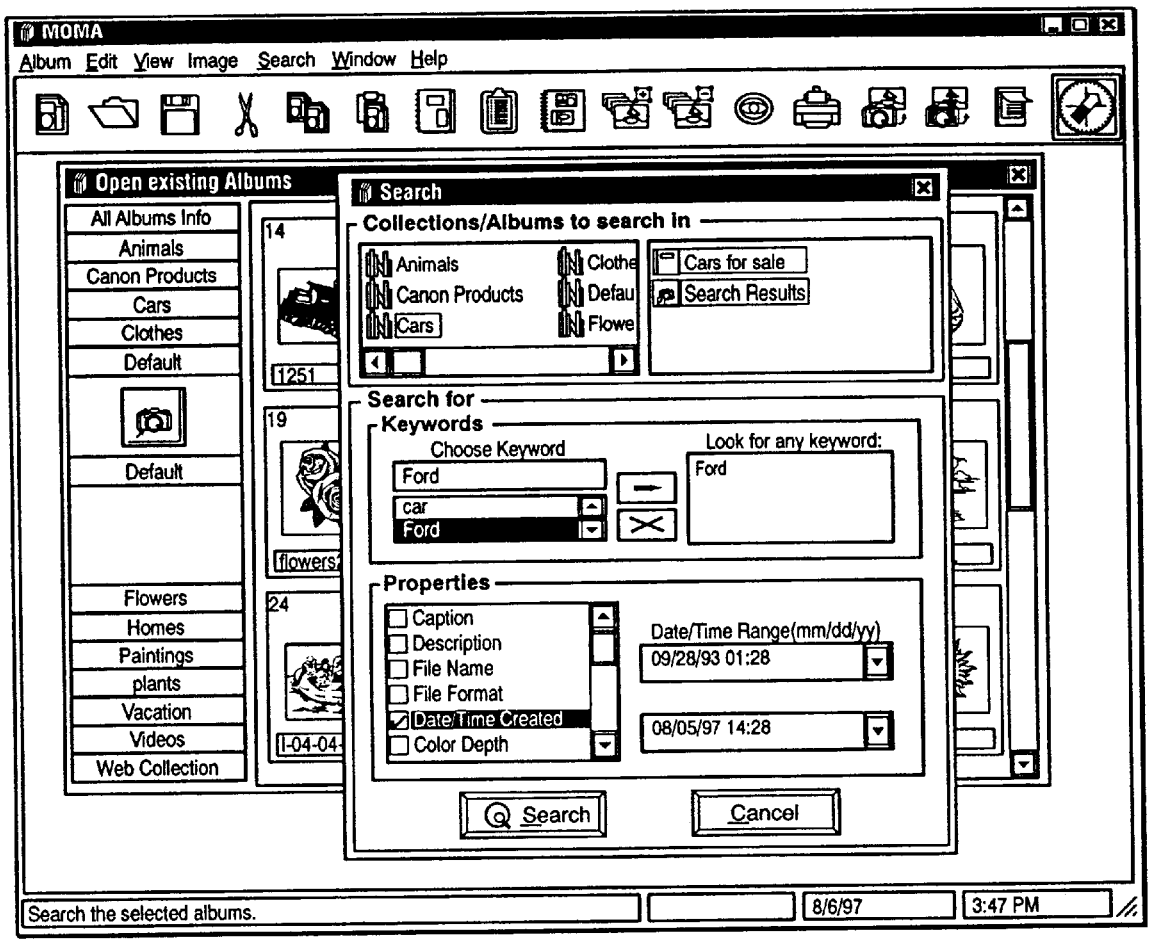
FIG. 34 illustrates a user interface for a "Search" dialog box.

The "Search" menu provides for four selectable items: "Sort", "Filter", "Query", and "Find". The search dialog is illustrated in FIG. 34.

[3.5.1 "Sort"]

By using the sorting functions, the user can arrange the album media files in alphabetical or numerical order. The user can sort any of the properties or combination of the properties in either ascending or descending order.

[3.5.2 "Filter"]

By using the filtering functions, the user can selectively display certain files by using predefined filtering criteria. For example, the filtering criteria can be used to selectively display files only with JPG format, files created between 1995–1996, files only related to flowers, etc.

[3.5.3 "Query"]

The real power of this media database management system is the powerful and flexible way to query the database system by suing predefined criteria. The user can question the database in terms of selected fields by using logical combinations such as "and", "or", "between", etc. The database engine can search the whole database system quickly and display all of these files that meet the specified criteria.

[3.5.4 "Find"]

The user can use the find dialog box to locate a file in the database by using index number, keyword, file type, file size, data, and time, etc.

[3.6 "Window Menu"]

The "Window" menu provides standard MDI windowing options, as follows:

[3.6.1 "Cascade"]

Arranges windows in a cascade formation so that the windows overlap one another so that the titles are showing.

[3.6.2 "Tile command"]

Arranges the windows in a tile formation so that the windows are truncated.

[3.6.3 "Arrange Icons"]

Arranges all windows icons along bottom edge of current view window.

[3.7 "Help Menu"]

The "Help" menu provides standard help functions, as follows:

[3.7.1 "Content"]

Displays the contents of the MOMA Help System, step-by-step instructions for using MOMA, reference information, examples and demonstrations of MOMA features. s the user looks through Help, the user can return to the Contents screen by clicking the Contents button in the Help window.

[3.7.2 "Search for Help on"]

Searches in Help for information related to topics on which the user wants more information. To use the Search For Help on command, type the topic or select it from the list in the Search dialog box, and then choose the Show Topics button to see related topics. To display a particular topic from the list of topics, select it and then choose the GO TO button. To quickly search for information in MOMA Help, double-click the Help button on the Standard toolbar to open the Search dialog box.

[3.7.3 "Index"]

Displays a comprehensive index to information contained in the MOMA Help system. To see the entries for a topic, click the first letter of the word the user wants to look up, or press TAB to select the letter and then press ENTER.

[3.7.4 "Technical Support"]

Gives details on product support options for MOMA available from Canon, including how to contact Canon Product Support Services world wide.

[3.7.5 "About MOMA"]

Displays information about the user's copy of MOMA, including the version number; the copyright, legal and licensing notices; and the system information for the user's computer.

It is emphasized that several changes may be applied on the above-described invention without departing from the teachings of the invention. In particular, it is intended that all matter contained in the present disclosure, or shown in the accompanying drawings, shall be interpreted as illustrative and not limiting.

What is claimed is:

1. A database system for organizing multimedia objects, with each object including at least an image component and a text component, the database system being organized into at least one collection with each collection having one or more multimedia albums, said database system comprising:

at least one table entry having a customizable format to store information corresponding to a collection in the database system, the collection information including identification of a component of multimedia objects in an album in the corresponding collection;

a user interface for displaying collections in the database system, said user interface further comprising an interface which allows a user to request creation of a new album and an interface which allows a user to request creation of a new collection;

means responsive to user actuation of the interface to request creation of a new album, for copying a pre-existing field format from other albums in the collection to which the new album is assigned; and means responsive to user actuation of the interface to request creation of a new collection, for defining a new field for albums in the collection and for storing the new field as a new table entry in the database system.

2. A database system according to claim 1, further comprising a table entry for each said multimedia album, each said table entry for each said multimedia album being linked to one of said table entries for a collection.

3. A database system according to claim 2, wherein each said table entry for each said multimedia album includes an entry for a picture file, wherein the picture file stores a list of image files corresponding to image components.

4. A database system according to claim 1, further comprising a table entry for each said image component, wherein each said table entry for each said image component is linked to one of said table entries corresponding to said collections.

5. A database system according to claim 4, wherein each said table entry for each image component includes a field for a thumbnail file and a field for an annotation file.

6. A database system according to claim 1, wherein said user interface displays an entry field for permitting entry of a new album name within an existing album collection.

7. A database system according to claim 1, wherein said user interface displays an option permitting creation of a new collection, and wherein upon selection of the option to create a new collection, said user interface displays a set of default fields for albums in the new collection.

8. A method for printing components of a multimedia object, the multimedia object including at least an image component and a text component, wherein each component corresponds to a field in a database record that stores the multimedia object, said method comprising the steps of:

displaying a user interface which includes a thumbnail view of the image component of the multimedia object, said user interface further displaying user-selectable fields corresponding to fields in the multimedia database;

accepting user selection of up to plural fields for printout with the image component; and outputting the image component together with the user-selected fields in the template selected by the user.

9. A method according to claim 8, wherein output is to a printer.

10. A method according to claim 8, wherein output is in HTML format for publication on the world wide web.

11. A method according to claim 8, further comprising a step responsive to user selection of a field for printout with the image component, wherein said step so responsive comprises modification of the thumbnail view of the image component so as to include a preview of the selected field.

12. A method according to claim 8, further comprising the step of displaying a user interface to allow a user to define page layout.

13. A method according to claim 8, further comprising the step of displaying a user interface to allow a user to select background and borders, said user interface further displaying a thumbnail preview of printout which includes user selected backgrounds and borders.

14. A method according to claim 8, further comprising the step of displaying a user interface which allows a user to save selected fields, selected page layout, and selected backgrounds and borders, all as a user defined template.

15. A method according to claim 14, further comprising the step of displaying a user interface which allows selection of a previously defined template.

16. A user interface for displaying a database of multimedia objects, with each multimedia object including at least an image component and a non-image component, with each component corresponding to a field in a database record for the multimedia component, the user interface comprising:

a display of at least a portion of the database in a table display, with each subsequent entry for multimedia objects in the database extending a first direction, and with each individual field within each database record extending in a second direction perpendicular to the first direction;

a cursor display of a mouse cursor corresponding to a position indicated by a user's pointing device, the mouse cursor being superimposed over one of the tabular entries in said table display; and a pop-up display of a thumbnail of an image component of a multimedia object, the pop-up display being displayed upon detection that the mouse cursor is displayed superimposed over the corresponding image component of the multimedia object, the pop-up display overlaying a portion of the table display.

17. A user interface according to claim 16, which upon selection of an image component of a multimedia object displays an image component.

18. A user interface according to claim 16, further comprising a pop-up display of a dialog that includes an entry field for global annotation of text, the pop-up display of dialog being displayed upon selection of the mouse cursor over a non-image text component.

19. A user interface according to claim 16, further comprising a pop-up display of a dialog for recording an audio annotation to a multimedia object, the pop-up display of the dialog being displayed upon selection with the mouse cursor of a non-image annotation component.

20. A user interface according to claim 16, further comprising a pop-up dialog including an interface to allow input of keywords, the pop-up dialog being displayed upon selection by the mouse cursor of a non-image keyword component of a multimedia object.

21. A system for managing multimedia objects, with each multimedia object including at least an image component and a non-image component, wherein each component corresponds to a field in a relational database for storing said multimedia objects, said system comprising:

a database access object responsive to structured query language inquiries so as to create database tables and fields, add and manipulate tables into the database, and add and manipulate fields within each table;

an image manager connected to said database access object, said image manager for adding, deleting, inserting, moving, cropping, re-sizing, and manipulating images, the image manager including interfaces to a TWAIN scanning protocol, image format translation applications, and image processing and manipulation applications;

an album manager connected to the database access object, the album manager for creating, opening, closing, saving and manipulating albums within the context of album collections, said album manager including an interface to functional modules for allowing special effects, HTML generation, album printing;

a view manager connected to the database access object, said view manager for view selection, database selection, table selection, and field selection; and wherein separate tables of the database store entries corresponding to at least one collection, album and multimedia object are created that are relatable so as to include a multimedia object in an album of a collection.

22. A system according to claim 21, wherein said database access objects includes a database description language (DDL) to create database tables and fields, to add tables into the database, and to add fields within each table, and further includes a database manipulation language (DML) to manipulate database tables and fields, to manipulate tables within the database, to manipulate fields within each table, and to update, search and edit database tables.

23. A system according to claim 21, further comprising TWAIN support interfaced to said image manager, said TWAIN support for providing TWAIN scanning protocol including TWAIN protocol for digital cameras.

24. A system according to claim 21, further comprising an image format translation application interfaced to said image manager, the image format translation application for opening and saving images having predefined image formats.

25. A system according to claim 21, further comprising an image processing and manipulation application interfaced to said image manager, the image processing and manipulation application including at least image translation and image color shifting capabilities.

26. A system according to claim 21, further comprising a functional module for special effects, the functional module for special effects interfaced to said album manager and providing image effects including speed and annotation effects.

27. A system according to claim 21, further comprising a functional module for HTML generation interfaced to said album manager, said functional module for HTML generation providing templates and template wizards for generating HTML-formatted files.

28. A system according to claim 21, further comprising a functional module for album printing interfaced to said album manager, said functional module for album printing for allowing printing in spreadsheet, thumbnail and HTML format.

29. A system according to claim 21, wherein said view manager includes an interface to an active server protocol for allowing access to database objects using an HTTP query protocol over the world wide web.

30. Computer-executable process steps stored on a computer readable medium, the process steps to form a database system for organizing multimedia objects, with each object including at least an image component and a text component, the database system being organized into at least one collection with each collection having one or more multimedia albums, the database system comprising:

at least one table entry having a customizable format to store information corresponding to a collection in the database system, the collection information including identification of a component of multimedia objects in an album in the corresponding collection;

a user interface for displaying collections in the database systems, said user interface further comprising an interface which allows a user to request creation of a new album and an interface which allows a user to request creation of a new collection;

means responsive to user actuation of the interface to request creation of a new album, for copying a pre-existing field format from other albums in the collection to which the new album is assigned; and means responsive to user actuation of the interface to request creation of a new collection, for defining a new field for albums in the collection and for storing the new field as a new table entry in the database system.

31. Computer-executable process steps according to claim 30, wherein the database system further comprises a table entry for each said multimedia album, each said table entry for each said multimedia album being linked to one of said table entries for a collection.

32. Computer-executable process steps according to claim 31, wherein each said table entry for each said multimedia album includes an entry for a picture file, wherein the picture file stores a list of image files corresponding to image components.

33. Computer-executable process steps according to claim 30, wherein the database system further comprises a table entry for each said image component, wherein each said table entry for each said image component is linked to one of said table entries corresponding to said collections.

34. Computer-executable process steps according to claim 33, wherein each said table entry for each image component includes a field for a thumbnail file and a field for an annotation file.

35. Computer-executable process steps according to claim 30, wherein said user interface displays an entry field for permitting entry of a new album name within an existing album collection.

36. Computer-executable process steps according to claim 30, wherein said user interface displays an option permitting creation of a new collection, and wherein upon selection of the option to create a new collection, said user interface displays a set of default fields for albums in the new collection.

37. Computer-executable process steps stored on a computer readable medium, the process steps to print components of a multimedia object, the multimedia object including at least an image component and a text component, wherein each component corresponds to a field in a database record that stores the multimedia object, the computer-executable process steps including steps of:

displaying a user interface which includes a thumbnail view of the image component of the multimedia object, said user interface further displaying user-selectable fields corresponding to fields in the multimedia database;

accepting user selection of up to plural fields for printout with the image component; and outputting the image component together with the user-selected fields in the template selected by the user.

38. Computer-executable process steps according to claim 37, wherein output is to a printer.

39. Computer-executable process steps according to claim 37, wherein output is in HTML format for publication on the world wide web.

40. Computer-executable process steps according to claim 37, further comprising a step responsive to user selection of a field for printout with the image component, wherein said step so responsive comprises modification of the thumbnail view of the image component so as to include a preview of the selected field.

41. Computer-executable process steps according to claim 37, further comprising the step of displaying a user interface to allow a user to define page layout.

42. Computer-executable process steps according to claim 37, further comprising the step of displaying a user interface to allow a user to select background and borders, said user interface further displaying a thumbnail preview of printout which includes user selected backgrounds and borders.

43. Computer-executable process steps according to claim 37, further comprising the step of displaying a user interface which allows a user to save selected fields, selected page layout, and selected backgrounds and borders, all as a user defined template.

44. Computer-executable process steps according to claim 43, further comprising the step of displaying a user interface which allows selection of a previously defined template.

45. Computer-executable process steps stored on a computer readable medium, the process steps to display a user interface for a database of multimedia objects, with each multimedia object including at least an image component and a non-image component, with each component corresponding to a field in a database record for the multimedia component, the user interface comprising:

a display of at least a portion of the database in a table display, with each subsequent entry for multimedia objects in the database extending a first direction, and with each individual field within each database record extending in a second direction perpendicular to the first direction;

a cursor display of a mouse cursor corresponding to a position indicated by a user's pointing device, the mouse cursor being superimposed over one of the tabular entries in said table display; and a pop-up display of a thumbnail of an image component of a multimedia object, the pop-up display being displayed upon detection that the mouse cursor is displayed superimposed over the corresponding image component of the multimedia object, the pop-up display overlaying a portion of table display.

46. Computer-executable process steps according to claim 45, wherein upon selection of an image component of a multimedia object, the user interface displays an image component.

47. Computer-executable process steps according to claim 45, wherein the user interface further comprises a pop-up display of a dialog that includes an entry field for global annotation of text, the pop-up display of dialog being displayed upon selection of the mouse cursor over a non-image text component.

48. Computer-executable process steps according to claim 45, wherein the user interface further comprises a pop-up display of a dialog for recording an audio annotation to a multimedia object, the pop-up display of the dialog being displayed upon selection with the mouse cursor of a non-image annotation component.

49. Computer-executable process steps according to claim 45, wherein the user interface further comprises a pop-up dialog including an interface to allow input of keywords, the pop-up dialog being displayed upon selection by the mouse cursor of a non-image keyword component of a multimedia object.

50. Computer-executable process steps stored on a computer readable medium, the process steps to implement a system for managing multimedia objects, with each multimedia object including at least an image component and a non-image component, wherein each component corresponds to a field in a relational database for storing said multimedia objects, said system comprising:

a database access object responsive to structured query language inquiries so as to create database tables and fields, add and manipulate tables into the database, and add and manipulate fields within each table;

an image manager connected to said database access object, said image manager for adding, deleting, inserting, moving, cropping, re-sizing, and manipulating images, the image manager including interfaces to a TWAIN scanning protocol, image format translation applications, and image processing and manipulation applications;

an album manager connected to the database access object, the album manger for creating, opening, closing, saving and manipulating albums within the context of album collections, said album manager including an interface to functional modules for allowing special effects, HTML generation, album printing; and a view manager connected to the database access object, said view manager for view selection, database selection, table selection, and field selection; and wherein separate tables of the database store entries corresponding to at least one collection, album and multimedia object table entries are created that are relatable so as to include a multimedia object in an album of a collection.

51. Computer-executable process steps according to claim 50, wherein said database access objects includes a database description language (DDL) to create database tables and fields, to add tables into the database, and to add fields within each table, and further includes a database manipulation language (DML) to manipulate database tables and fields, to manipulate tables within the database, to manipulate fields within each table, and to update, search and edit database tables.

52. Computer-executable process steps according to claim 50, wherein the system further comprises TWAIN support interfaced to said image manager, said TWAIN support for providing TWAIN scanning protocol including TWAIN protocol for digital cameras.

53. Computer-executable process steps according to claim 50, wherein the system further comprises an image format translation application interfaced to said image manager, the image format translation application for opening and saving images having predefined image formats.

54. Computer-executable process steps according to claim 50, wherein the system further comprises an image processing and manipulation application interfaced to said image manager, the image processing and manipulation application including at least image translation and image color shifting capabilities.

55. Computer-executable process steps according to claim 50, wherein the system further comprises a functional module for special effects, the functional module for special effects interfaced to said album manager and providing image effects including speed and annotation effects.

56. Computer-executable process steps according to claim 50, wherein the system further comprises a functional module for HTML generation interfaced to said album manager, said functional module for HTML generation providing templates and template wizards for generating HTML-formatted files.

57. Computer-executable process steps according to claim 50, wherein the system further comprises a functional module for album printing interfaced to said album manager, said functional module for album printing for allowing printing in spreadsheet, thumbnail and HTML format.

58. Computer-executable process steps according to claim 50, wherein said view manager includes an interface to an active server protocol for allowing access to database objects using an HTTP query protocol over the world wide web.

59. A memory for organizing multimedia objects within collections of albums, the memory comprising:
  plural data structures stored in said memory, the plural data structures comprising:
    at least one multimedia object data structure including plural fields containing information of a multimedia object;
    at least one album data structure including plural fields containing information of an album;
    at least one collection data structure including plural fields containing information of a collection,
    wherein each of the data structures are separate from the others, at least one of the plural fields of the collection data structure identifying the at least one album data structure and the at least one multimedia object data structure thereby relating a collection to an album including at least one multimedia object.

60. A memory of claim 59, wherein some of the plural fields of collection entries are customizable and may differ from collection to collection.

61. A memory of claim 59 wherein the collection data structure is part of one or more collection tables in a database system, each collection table corresponding to a different collection of albums.

62. A memory of claim 59 wherein the album data structure is part of one or more album tables in a database system.

63. A memory of claim 59 wherein the multimedia object data structure is part of one or more multimedia object tables in a database system.

64. A memory of claim 59 wherein one or more of the plural fields of the multimedia object data structure reference an externally-stored image component of the multimedia object.

65. A memory of claim 64 wherein the image component is a thumbnail image.

66. A memory of claim 64 wherein one or more of the plural fields of the multimedia object data structure indicate a size of the externally-stored image component.

* * * * *

UNITED STATES PATENT AND TRADEMARK OFFICE
CERTIFICATE OF CORRECTION

PATENT NO. : 6,301,586 B1
DATED : October 9, 2001
INVENTOR(S) : Xinping Yang et al.

It is certified that error appears in the above-identified patent and that said Letters Patent is hereby corrected as shown below:

Title page,
Item [56] References Cited, "/documentsaccc97ds/" should read -- /documents/acc97ds/ --.

Column 3,
Line 60, "whowing" should read -- showing --.

Column 15,
Line 42, "boarders" should read -- borders --.

Column 16,
Lines 35 and 49, "(F) One image" should read -- (P) One image --.

Column 19,
Line 61, "Boarders" should read -- Borders --.

Column 21,
Line 53, "are" should read -- which are --.

Column 22,
Line 32, "in cell" should read -- in-cell --.

Column 25,
Line 5, "s the user looks through Help, the" should read -- The --.

Column 26,
Line 64, "extending" should read -- extending in --.

Column 27,
Line 59, "objects includes" should read -- object includes --.

Column 30,
Line 3, "extending" should read -- extending in --.

UNITED STATES PATENT AND TRADEMARK OFFICE
CERTIFICATE OF CORRECTION

PATENT NO. : 6,301,586 B1
DATED : October 9, 2001
INVENTOR(S) : Xinping Yang et al.

It is certified that error appears in the above-identified patent and that said Letters Patent is hereby corrected as shown below:

Column 31,
Line 7, "objects includes" should read -- object includes --.

Column 32,
Lines 26, 30, 33 and 36, "claim 59" should read -- claim 59, --.
Lines 40 and 42, "claim 64" should read -- claim 64, --.

Signed and Sealed this

Second Day of April, 2002

*Attest:*

*Attesting Officer*

JAMES E. ROGAN
*Director of the United States Patent and Trademark Office*